US006239928B1

(12) United States Patent
Whitehead et al.

(10) Patent No.: US 6,239,928 B1
(45) Date of Patent: May 29, 2001

(54) EXTENDABLE EXTERIOR REARVIEW MIRROR ASSEMBLY FOR VEHICLES

(75) Inventors: Peter J. Whitehead; Steven G. Hoek, both of Holland; Michiel P. van de Ven, Zeeland, all of MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/573,502

(22) Filed: May 16, 2000

Related U.S. Application Data

(63) Continuation-in-part of application No. 09/399,875, filed on Sep. 20, 1999, now Pat. No. 6,116,743.

(51) Int. Cl.⁷ .................................................. G02B 7/182
(52) U.S. Cl. ........................ 359/871; 359/872; 359/874; 359/875; 359/877
(58) Field of Search ........................... 359/871, 872, 359/874, 875, 877; 248/472, 537, 478, 479, 484

(56) References Cited

U.S. PATENT DOCUMENTS

| D. 285,549 | 9/1986 | Haack ................................ D12/187 |
| D. 331,216 | 11/1992 | McGouldrick ..................... D12/187 |
| 3,118,965 | 1/1964 | Jones ..................................... 88/93 |
| 3,119,591 | 1/1964 | Malecki .............................. 248/282 |
| 3,420,490 | 1/1969 | Malachowski ..................... 248/486 |
| 4,135,694 | 1/1979 | Stegenga et al. .................. 218/478 |
| 4,315,614 | 2/1982 | Stegenga et al. .................. 248/479 |
| 4,730,913 | 3/1988 | Boothe ............................... 350/604 |
| 4,740,066 | 4/1988 | Whitehead ......................... 350/604 |
| 4,789,232 | 12/1988 | Urbanek ............................. 350/632 |
| 4,793,582 | 12/1988 | Bronstein et al. ................. 248/486 |
| 4,815,836 | 3/1989 | Byers et al. ....................... 350/604 |
| 4,907,871 | 3/1990 | Hou .................................... 350/639 |
| 4,911,545 | 3/1990 | Miller ................................ 350/604 |
| 4,921,337 | 5/1990 | Hou .................................... 350/604 |
| 4,998,812 | 3/1991 | Hou .................................... 350/604 |
| 5,028,029 | 7/1991 | Beck et al. ........................ 248/479 |
| 5,061,056 | 10/1991 | You .................................... 259/872 |
| 5,096,283 | 3/1992 | Croteau ............................. 359/865 |
| 5,217,197 | 6/1993 | Spitzer .............................. 248/479 |
| 5,292,100 | 3/1994 | Byers et al. ....................... 248/480 |
| 5,432,640 | 7/1995 | Gilbert et al. .................... 359/841 |
| 5,483,385 | 1/1996 | Boddy ............................... 359/841 |
| 5,489,080 | 2/1996 | Allen ................................. 248/480 |
| 5,513,048 | 4/1996 | Chen ................................. 359/881 |
| 5,546,239 | 8/1996 | Lewis ................................ 359/855 |
| 5,572,376 | 11/1996 | Pace .................................. 359/877 |
| 5,623,374 | 4/1997 | Montanbault .................... 359/841 |
| 5,760,977 | 6/1998 | Leder et al. ..................... 359/841 |
| 5,903,402 | 5/1999 | Hoek ................................. 359/841 |

FOREIGN PATENT DOCUMENTS 2013178   9/1990   (CA) .

*Primary Examiner*—Mohammad Sikder
(74) *Attorney, Agent, or Firm*—Van Dyke, Gardner, Linn & Burkhart, LLP

(57) ABSTRACT

An extendable exterior rearview mirror assembly includes a mounting bracket, a mirror subassembly, and a support which is supported by the mounting bracket. The mirror subassembly is supported by the support and is mounted for selective movement along the support arm to one of a plurality of viewing positions. The mirror subassembly includes a housing, a reflective element, and an actuator which supports the reflective element on a forward facing wall of the housing. The rearview mirror assembly further includes a clamping assembly which provides a force to urge frictional engagement between the housing and the support to limit movement of the mirror subassembly along the support. In preferred form, the support extends into the housing and frictionally engages an exterior surface of the forward facing wall.

21 Claims, 16 Drawing Sheets

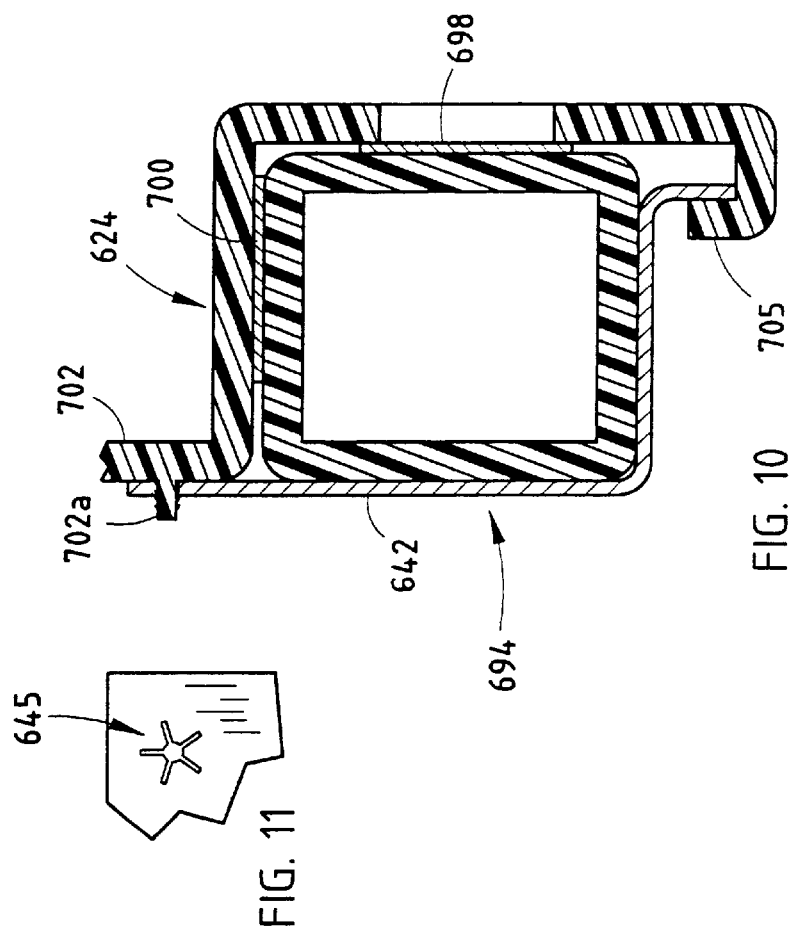
FIG. 10
FIG. 11
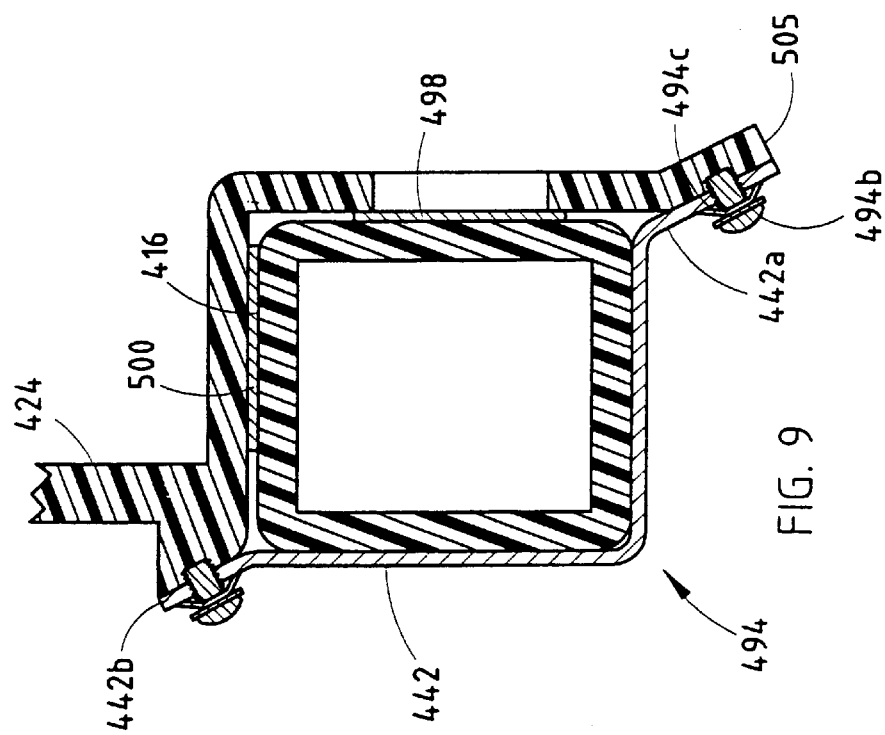
FIG. 9

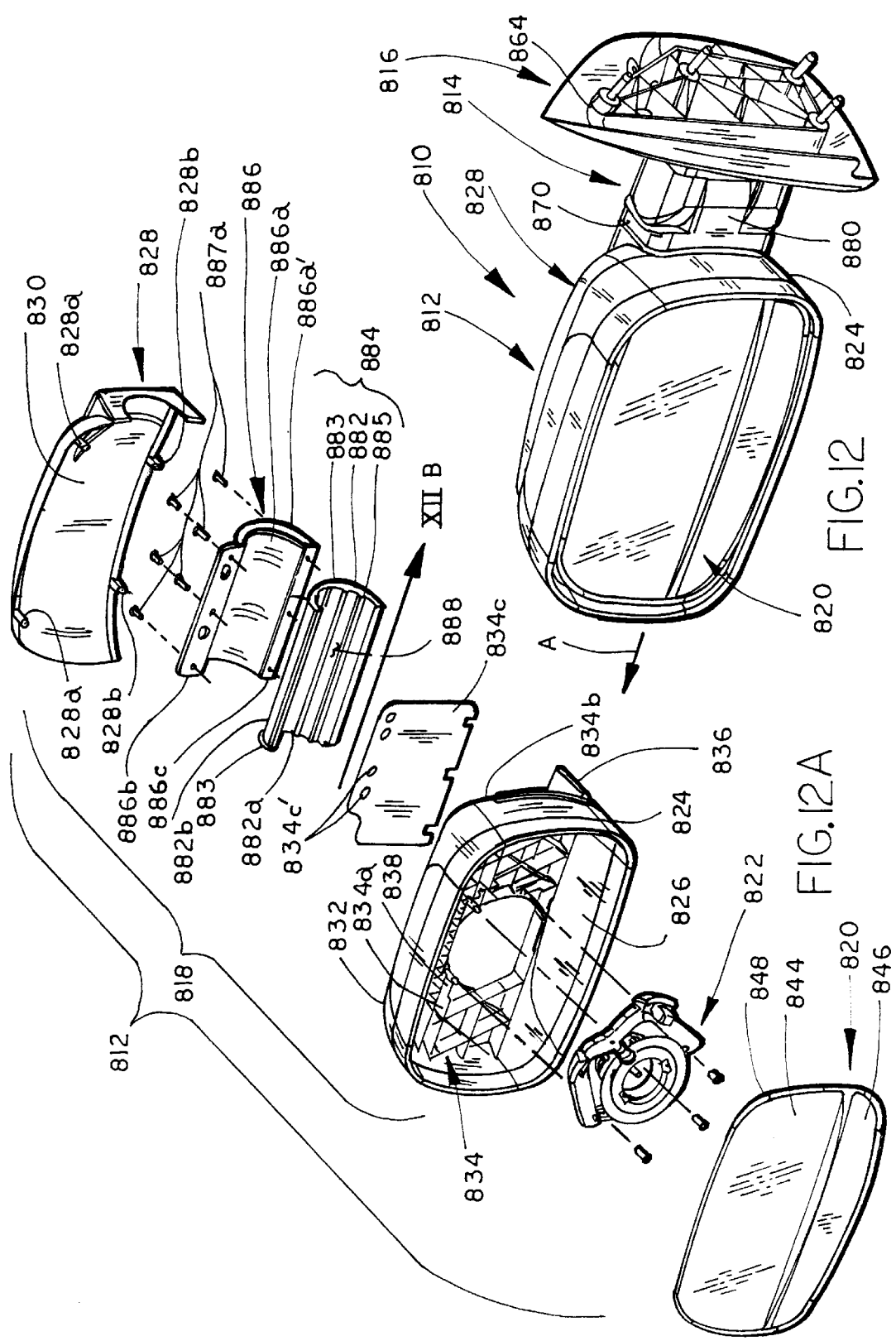

EXTENDABLE EXTERIOR REARVIEW MIRROR ASSEMBLY FOR VEHICLES

This is a continuation-in-part application of application entitled EXTENDABLE EXTERIOR REARVIEW MIRROR ASSEMBLY FOR VEHICLES, Ser. No. 09/399,875, filed Sep. 20, 1999, now U.S. Pat. No. 6,116,743 the disclosure of which is herein incorporated by reference in its entirety.

TECHNICAL FIELD AND BACKGROUND OF THE INVENTION

The present invention relates to an exterior rearview mirror for mounting on a vehicle and, more particularly, to an extendable exterior rearview mirror for mounting on a vehicle which can be extended when the vehicle is being used for towing, for example towing a trailer, camper, or the like.

Until recently, towing mirrors included a fixed support or frame, which was rigidly mounted to the vehicle body, and a reflective element supported on and spaced from the vehicle body by the support or frame to provide rearview viewing of the towed object. For example, U.S. Pat. No. 3,119,591 to A. J. Malecki illustrates a typical rigidly mounted towing mirror assembly. However, these fixed extended rearview mirror assemblies increase the width of the vehicle often hampering normal maneuvering through passages including garage door openings, drive-through services, and the like. Furthermore, they are more vulnerable to being damaged or causing damage than conventional exterior rearview mirrors especially when used by an inexperienced driver. In some cases, the width of the vehicles was increased beyond the maximum width allowed by conventional vehicle transport trucks which deliver the vehicles to the dealership. Therefore, these mirror assemblies often required installation at the dealership which ultimately increased the cost of the vehicle.

More recently, several extendable exterior rearview mirrors have been developed. For example, in U.S. Pat. No. 5,513,048 to Chen and U.S. Pat. No. 5,489,080 to Allen, extendable rearview mirrors are disclosed which include telescoping members. The position of the mirror subassembly, which includes a reflective element and reflective element housing, is fixed in position by threaded fasteners, which require tools for adjustment. However, these assemblies tend to increase the vibration of the mirror assembly especially when the mirror subassembly is in the outboard position. This increased vibration is particularly problematic in mirror assemblies that incorporate mechanical or electrical actuators since they increase the weight of the mirror casing. Other solutions have included providing nesting mirror reflectors with one of the mirror reflectors supported in a housing that is extendable from the mirror casing, such as described in U.S. Pat. No. 4,998,812 and 4,907,871 to Hou. While these assemblies incorporate a single arm mounting arrangement, the assembly is complicated and requires a dual reflection system that ultimately increases the cost of the assembly, as well as the weight of the mirror casing. Heretofore, commercially available exterior mirrors have used a twin arm arrangement in order to increase the stiffness of the mounting attachment, such as disclosed in U.S. Pat. No. 5,483,385 to Boddy. Such twin arms provide support to the mirror casing in a manner that minimizes mirror reflector vibrations when the vehicle travels on roads. However, use of such twin aim arrangements dictates a relatively large assembly with multiple mounting components, which increases material cost and assembly time. Hitherto, use of a single arm extendible mirror assembly has not met with commercial success because of the reduced stiffness associated with prior art designs which result in increased vibration.

Consequently, there is a need for an extendable rearview mirror assembly that can provide for an extended field of view when towing and yet can be retracted to a normal operating position where it does not hamper maneuverability of the vehicle. In addition, the extendable rearview mirror assembly should have minimal impact on the vibration characteristics of the mirror assembly and be relatively easy to adjust between non-towing and towing positions without the need for tools.

SUMMARY OF THE INVENTION

Accordingly, the present invention provides an improved vehicular extendable exterior rearview mirror assembly which is especially suitable for use on vehicles when towing. The exterior rearview mirror assembly is adjustable to a plurality of viewing positions between a normal non-towing use position and a fully extended position, allowing an adjustable field of view to the rear of the vehicle. Additionally, the mirror assembly may include a break-away assembly to permit the mirror assembly to be folded to a break-away position in the event the mirror assembly strikes an object. Furthermore, the mirror assembly may include a power fold mechanism which allows the mirror subassembly to be folded or retracted to a folded position when the vehicle is driven into tight spaces, for example parking garages and the like.

According to one aspect of the invention, the extendable exterior rearview mirror assembly includes a mounting bracket, a mirror subassembly, a clamp, and a support which is mounted for pivotal movement on the mounting bracket between a normal operating position and a folded, break-away position. The support extends laterally outward from the mounting bracket when the mirror subassembly is mounted to the vehicle and the support is in its normal operating position. The support extends into the housing of the mirror subassembly, where the clamp is positioned to mount the mirror subassembly onto the support. The clamp applies a force to urge frictional engagement between the support and the housing to limit movement of the mirror subassembly along the support but permits selective movement of the mirror subassembly along the support to one of at least two viewing positions when a force of sufficient magnitude is applied to the subassembly to overcome the friction between the support and the housing.

In one aspect, the support comprises a single support arm. In other aspects, the mirror assembly further includes a load distributing member, which together with the clamp urges frictional engagement between the support and the housing. In another aspect, the support moves relative to the load distributing member when the mirror subassembly moves along the support.

In yet other aspects, the clamp includes a passage, such as a longitudinal passage, in which the load distributing member is positioned. At least a portion of the support extends into the passage to be urged by the clamp into frictional engagement with the housing. In further aspects, the load distributing member comprises an elongate member having a longitudinal extent extending along at least a portion of the support. Preferably the load distributing member comprises an arcuate-shaped elongate member. The support arm has an arcuate bearing surface and a planar side with a plurality of line bearing surfaces, with the load distributing member contacting the arcuate bearing surface and urging the line bearing surfaces to frictionally engage the housing.

In further aspects, the support arm comprises a composite elongate body which includes an elongate webbed member having the arcuate bearing surface and a plate bearing member which provides the line bearing surfaces.

In other aspects, the housing includes a mirror casing, with the clamp urging the support into frictional engagement with the mirror casing. For example, the mirror casing may include a casing wall which defines a cavity, with the reflective element supported in the cavity by the casing wall. The clamp urges the support arm into frictional engagement with the casing wall.

In yet further aspects, the mirror assembly includes a positioning device, which supports the reflective element on the casing wall. For example, the positioning device may comprise an electrical actuator.

In another aspect, the extendable exterior rearview mirror assembly further includes a driver assembly which selectively moves the mirror subassembly along the support arm.

According to another form of the invention, an extendable exterior rearview mirror assembly includes a mounting bracket, a mirror subassembly, and a support. The mirror subassembly includes a housing, a reflective element, and an actuator. The housing includes a mirror casing. The support is mounted to the mounting bracket and extends from the vehicle in a laterally outward direction and into a housing of the mirror subassembly when the mirror assembly is mounted to the vehicle. The mirror assembly further includes a clamp which mounts the mirror subassembly on the support. The clamp applies a force to the support to urge frictional engagement between the support and the mirror casing to limit movement of the mirror subassembly along the support. The mirror slides along support to one or more extended viewing positions when a force is applied to the mirror subassembly in the laterally extending direction sufficient to overcome the friction between the support and the mirror casing.

In further aspects, the mirror casing includes a back wall. The actuator preferably supports the reflective element on the back wall. The clamp applies a force which urges the support into frictional engagement with the back wall. Preferably, the clamp includes a load distributing member which urges the support into frictional engagement with the back wall and, further, distributes the force from the clamp along the length of the support positioned in the clamp. For example, the support preferably includes an arcuate bearing surface and a planar bearing surface. The load distribution member preferably comprises an arcuate elongate member which engages the arcuate bearing surface of the support arm and urges the planar bearing surface of the support into frictional engagement with the exterior portion of the back wall of the mirror casing.

In yet further aspects, the arcuate elongate member forming the load distributing member may include a plurality of inwardly projecting elongate ribs, which contact the arcuate bearing surface of the support. In addition, the arcuate member may include a plurality of exteriorly positioned elongate ribs, which are contacted by the clamp to mount the mirror subassembly on the support. Preferably, the exteriorly positioned elongate ribs are offset from the inwardly projecting elongate ribs which thereby form discrete spring members in the load distributing member.

In other aspects, the housing further includes a cover which is coupled to the mirror casing and defines a cavity into which the support extends for frictionally engaging the mirror casing.

As will be understood, the exterior rearview mirror assembly of the present invention provides numerous advantages over prior known extendable rearview mirror assemblies. The exterior rearview mirror assembly incorporates a single support arm for mounting the mirror subassembly to a vehicle on which the mirror subassembly can be moved to a plurality of extended positions to provide an adjustable extended field of view and which can be quickly retracted to a normal operating position where it does not hamper the maneuverability of the vehicle or increase the width of the vehicle. In addition, the exterior rearview mirror assembly can be adjusted either manually or by the use of a driver, which can be operated by a remote control within the vehicle cabin. Thus, the single arm extendable mirror assembly of the present invention provides a compact assembly with excellent vibrational performance when mounted and used on a vehicle. Hitherto, such excellent vibrational performance is achieved and has been achieved commercially such as by using twin arm extendable mirror assemblies such as described in U.S. Pat. No. 5,483,385 to Boddy. Achieving an acceptable and user appreciable or enjoyable exterior mirror assembly performance when the assembly is mounted to the vehicle while using a single arm is a significant advantage as this allows a more compact design and thus, a more consumer appreciable or appealing design.

These and other objects, advantages, purposes and features of the invention will become more apparent from the study of the following description taken in action with the drawings.

BRIEF DESCRIPTION OF THE DRAWINGS

FIG. 9 is a similar view to FIG. 7 illustrating a third embodiment of the mounting arrangement of the support arm of the mirror assembly;

FIG. 10 is a similar view to FIG. 7 illustrating a fourth embodiment of the mounting arrangement of the support bracket of the mirror assembly;

FIG. 11 is an enlarged view of the connection of the support arm assembly of FIG. 10 as viewed along line XI—XI in FIG. 10;

FIG. 12 is a perspective view of a third embodiment of an extendable rearview mirror assembly of the present invention;

FIGS. 12A and 12B are exploded perspective views of the exterior rearview mirror assembly of FIG. 12;

DESCRIPTION OF THE PREFERRED EMBODIMENTS

Figure 1:
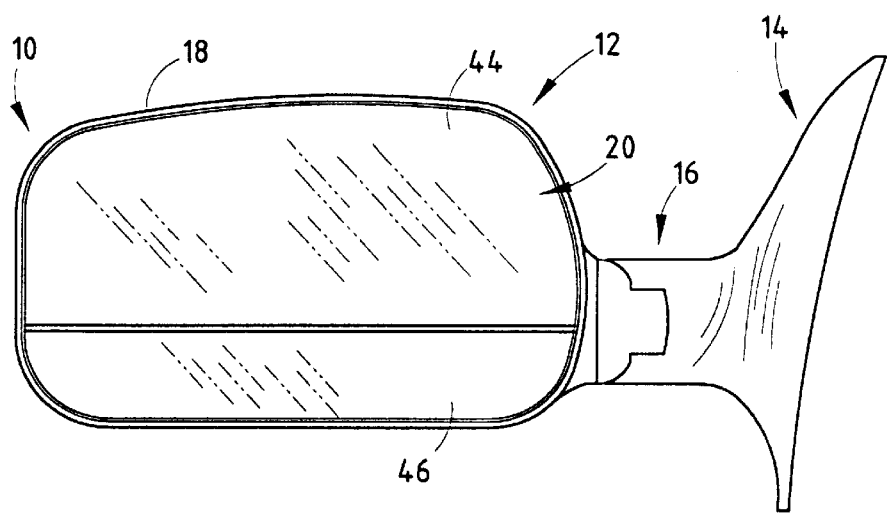
FIG. 1 is a front elevation view of an extendable exterior rearview mirror assembly of the present invention.

Referring to FIG. 1, an exterior rearview mirror assembly 10 of the present invention is illustrated. Rearview mirror assembly 10 includes a mirror subassembly 12 which is mounted to a mirror mounting bracket 14 by a mono support arm 16. As will be more fully described below, mirror support arm 16 provides for extension of mirror subassembly 12 to a plurality of extended positions from mirror mounting bracket 14 so that the occupant of the vehicle can have an adjustable extended field of view rearward of the vehicle. Furthermore, mounting bracket 14 preferably comprises a break-away mounting assembly, such that mirror subassembly 12 can be moved from a normal operating position (shown in solid in FIG. 3) toward a folded, break-away position adjacent the vehicle body (shown in phantom in FIG. 3).

Figure 4:
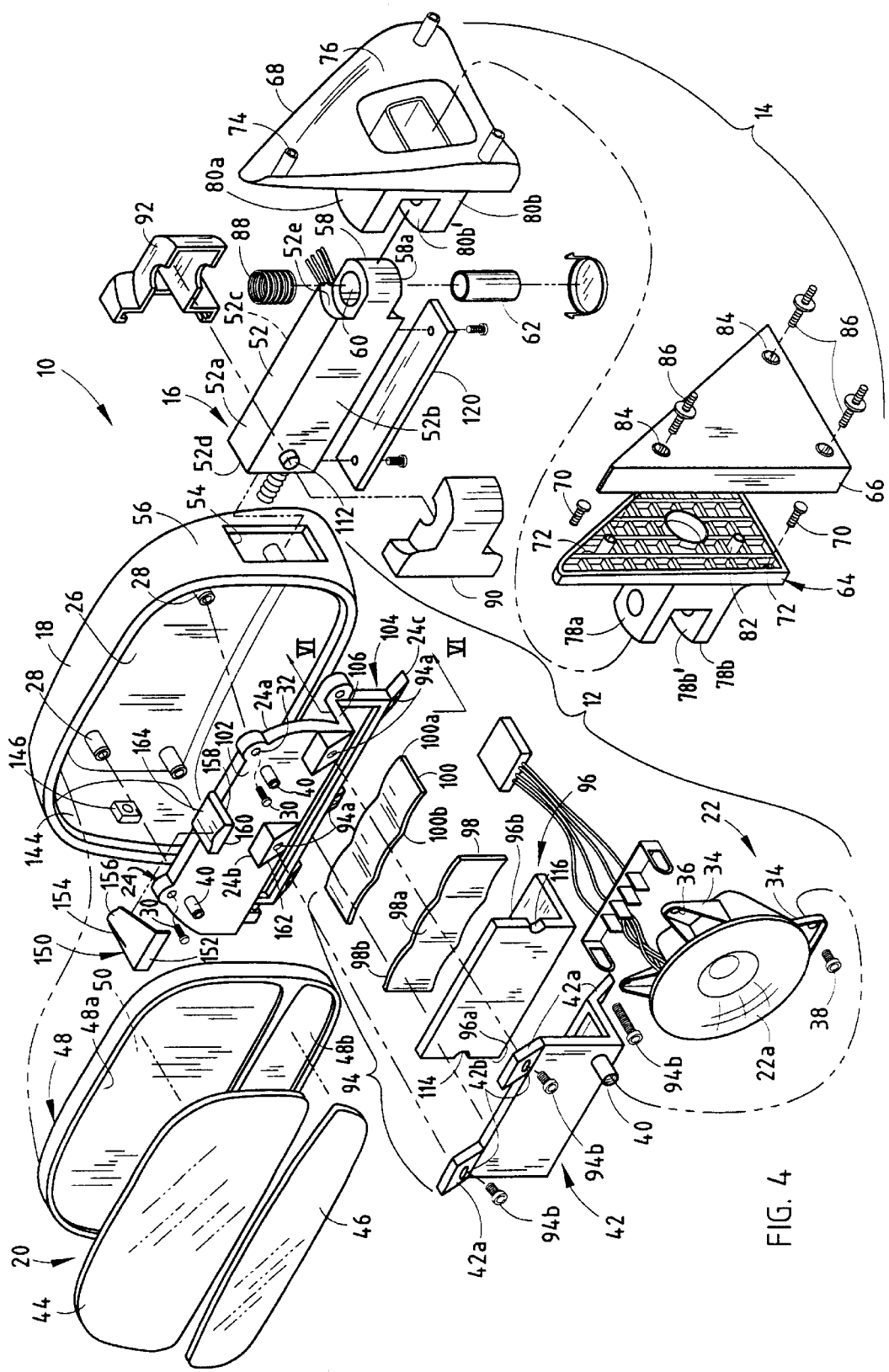
FIG. 4 is an exploded perspective view of the mirror assembly of FIG. 1.

As best seen in FIGS. 1 and 4, mirror subassembly 12 includes a mirror casing or housing 18 and a reflective element assembly 20, which is mounted in housing 18 by a positioning device 22, preferably an electrically operated actuator. Such electrical actuators may incorporate resistive track or Hall Effect sensors. It should be understood that other positioning devices may be used, including manually operated actuators, a remote manually operated actuator, such as a BODEN cable actuator or the like. Housing 18 is preferably injection molded from a suitable plastic, such as nylon, acrylonitriale butadiene styrene (ABS) or suitable resinous plastic, or the like which is commercially available under the trademark TERLURKAN KR2889® by BASF Company of Wyandotte, Mich. Alternatively, other resinous, melt processible plastics or moldable materials such as mineral filled or glass filled nylon or polyester or polypropylene can be used to form housing 12. A suitable nylon is 13% glass modified nylon 6:6 sold as ZYTEL 71G13L® by I. E. DuPont de Nemours & Company of Wilmington, Del. or PA123G13BK-47 by Bay Resins, Inc. of Millington, Md. A suitable polypropylene is TENITE P6M4Z-007® by Eastman Chemical Products of Kingsport, Tenn. Alternately, housing 18 may comprise a reinforced nylon plastic, thermo plastic, polypropylene, or other similar thermo plastic or thermoset materials.

Referring to FIG. 4, actuator 22 is mounted to mirror housing 18 by an actuator bracket 24, which is rigidly mounted to a rear wall 26 of housing 18 on a plurality of mounting bosses 28 by fasteners 30. Fasteners 30 extend through respective mounting openings 32 provided in actuator bracket 24. In this manner actuator bracket 24 is rigidly mounted to mirror housing 18. To mount actuator 22 to bracket 24, actuator 22 includes a plurality of mounting tabs 34, which include mounting openings 36 for receiving fasteners 38 which extend through tabs 34 to secure actuator assembly 22 to mounting bosses 40 provided on actuator bracket 24 and further on clamp 42, which will be more fully described below.

Actuator 22 supports reflective element assembly 20 and preferably provides for multi-axis positioning of reflective assembly 20. As best seen in FIG. 4, reflective element assembly 20 includes a first reflective mirror element 44 and a second reflector element 46. Each reflective mirror element 44 and 46 may comprise a conventional nonelectro-optic or electrochromic flat or planar reflective mirror element or a convex or multiradiused/aspheric reflective mirror element. In preferred form, reflective element 44 comprises a flat or planar reflective element while reflective element 46 comprises a convex or multiradiused/aspheric reflective element to provide a wide angle view or spotter mirror. For example, each reflective element may comprise a metallic reflector coated glass or plastic substrate, such as a thin chromium alloy reflector coating or a non-metallic reflector coating such as the dichroic layer described in U.S. Pat. No. 5,207,492 to Roberts et al. or a reflector comprising a silicon reflective layer such as described in U.S. Pat. No. 5,535,056 to Caskey et al. which are herein incorporated by reference in their entireties. Alternately, the reflective elements may comprise a variable reflective electro-optic element, such as an electrochromic mirror element comprising one of several types of electrochromic elements, for example an element of the electrochemichromic type which is disclosed in U.S. Pat. No. 5,140,455 issued to Varaprassad et al. or maybe the solid state type such as disclosed in, for example, U.S. Pat. No. 4,712,879 issued to Niall R. Lynam et al.; U.S. Pat. No. 5,910,854; and U.S. patent application Ser. No. 08/238,521, filed Mar. 5, 1994, by Varaprassad et al. now U.S. Pat. No. 5,668,663, all commonly assigned with the present application to Donnelly Corporation of Holland, Mich., the disclosures of which are herein incorporated by reference in their entireties. Reflective assembly 20 further includes a reflective element holder 48 which includes first and second recessed support arm surfaces 48a and 48b for the respective reflective elements and on which the respective reflective elements are secured by, for example, an adhesive, adhesive tape, or the like. Actuator 22 includes a movable member 22a which is mounted to the rearward surface 50 of reflective element holder 48 to provide adjustment of the orientation of the reflective elements about one or more axes and, more preferably, about horizontal and vertical axes, as will be understood by those skilled in the art.

Support arm 16 includes an elongated body 52, which extend into housing 18 through an opening 54 provided in end wall 52d of housing 18. Support arm 16 further includes a mounting portion 58 which includes a transverse bore 60 for receiving a mounting bushing 62 which pivotally mounts support arm 16 to mounting bracket 14. Support arm 16 preferably comprises a reinforced elongate box shaped member preferably formed from a suitable plastic, for example thermoplastic polymer resin, or thermoset polymer resin or may be a metal element, such as aluminum or a zinc die casting. As best understood from FIGS. 4 and 5, arm 16 includes a top wall 52a, opposed side walls 52b, 52c, and two end walls 52d, 52e. Extending transversely between side walls 52b, 52c and top wall 52a are a plurality of spaced reinforcing webs 118 which create interstices or openings therebetween. Reinforcing webs 118 increase the stiffness of arm 16 without the corresponding increase in weight normally associated with a solid support arm.

In the illustrated embodiment, mounting bracket 14 includes a base 64, a base gasket 66, and a base cover 68. Base cover 68 is secured to base 64 by fasteners 70, which extend through mounting openings 72 provided in base 64 and into corresponding mounting bosses 74 provided on the inner surface 76 of base cover 68. Projecting outwardly from base 64 are a pair of upper and lower mounting flanges or ears 78a and 78b, which extend into a corresponding pair of upper and lower flange covers or hollow ears 80a and 80b which project outwardly from base cover 68. Bushing 62 extends between upper and lower mounting flanges 78a and 78b and is preferably journaled in both upper and lower mounting flanges 78a and 78b to load both flanges. Previous designs with bushings journaled in only one bracket flange have exhibited vibration performance degradation. With both ends of the bushing journaled in the mounting flanges, the mounting flanges are subjected to reduced bending moments, thus reduced wear and tear on the connection. Extending rearwardly from base 64 are a plurality of mounting bosses 82, which align with corresponding mounting openings 84 provided in base gasket 66, which receive a corresponding plurality of mounting fasteners 86 which secure base 64 and, in turn, cover 68 directly to the vehicle, for example the vehicle door frame or panel.

Figure 3:
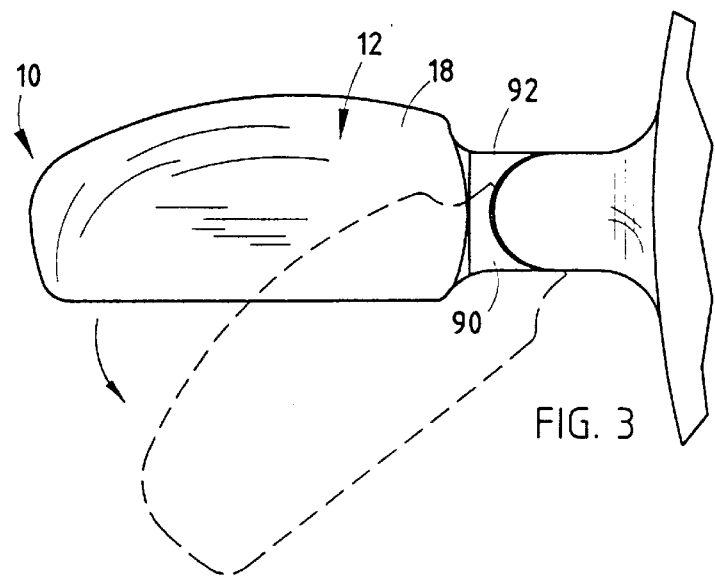
FIG. 3 is a plan view of the mirror assembly of FIG. 1 illustrating the mirror subassembly in a folded position.

In order to fix the position of mirror subassembly 12, mirror mounting bracket 14 includes a spring 88, which biases the lower surface 58a of mounting flange 58 into frictional engagement with the upper surface 80b' of lower flange cover 80b. In this manner, in order to move mirror subassembly 12 and support arm 16 to a folded, break-away position, as shown in FIG. 3, a force must be applied to mirror subassembly 12 or support arm 16 to overcome the friction between mounting flange 58 and lower flange cover 80b and to compress spring 88. It should be understood, that other break-away mounting arrangements may be used to mount support arm 16 to mounting bracket 14.

Figure 2:
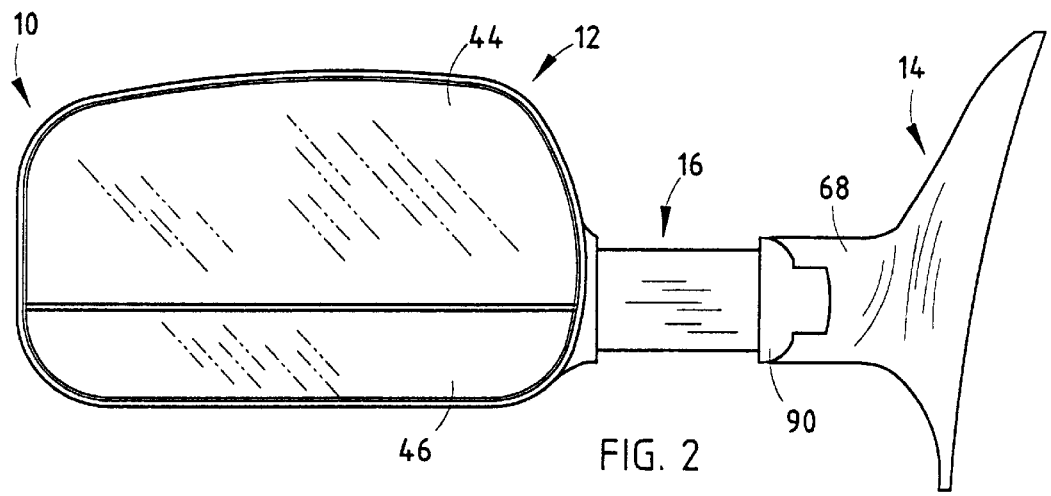
FIG. 2 is a similar view to FIG. 1 with a mirror subassembly in an extended position.

As best seen in FIGS. 1, 2, and 4, mirror assembly 10 preferably includes support arm covers 90 and 92 which extend over mounting portion 58 and over an end portion of elongated body 52 and are preferably sized such that when mirror housing is in its retracted position, covers 90, 92 abut housing 18 and base cover 68 and together form a substantially continuous outer shell which provides an aesthetic mirror assembly and further reduces the aerodynamic drag of the mirror assembly.

Figure 5:
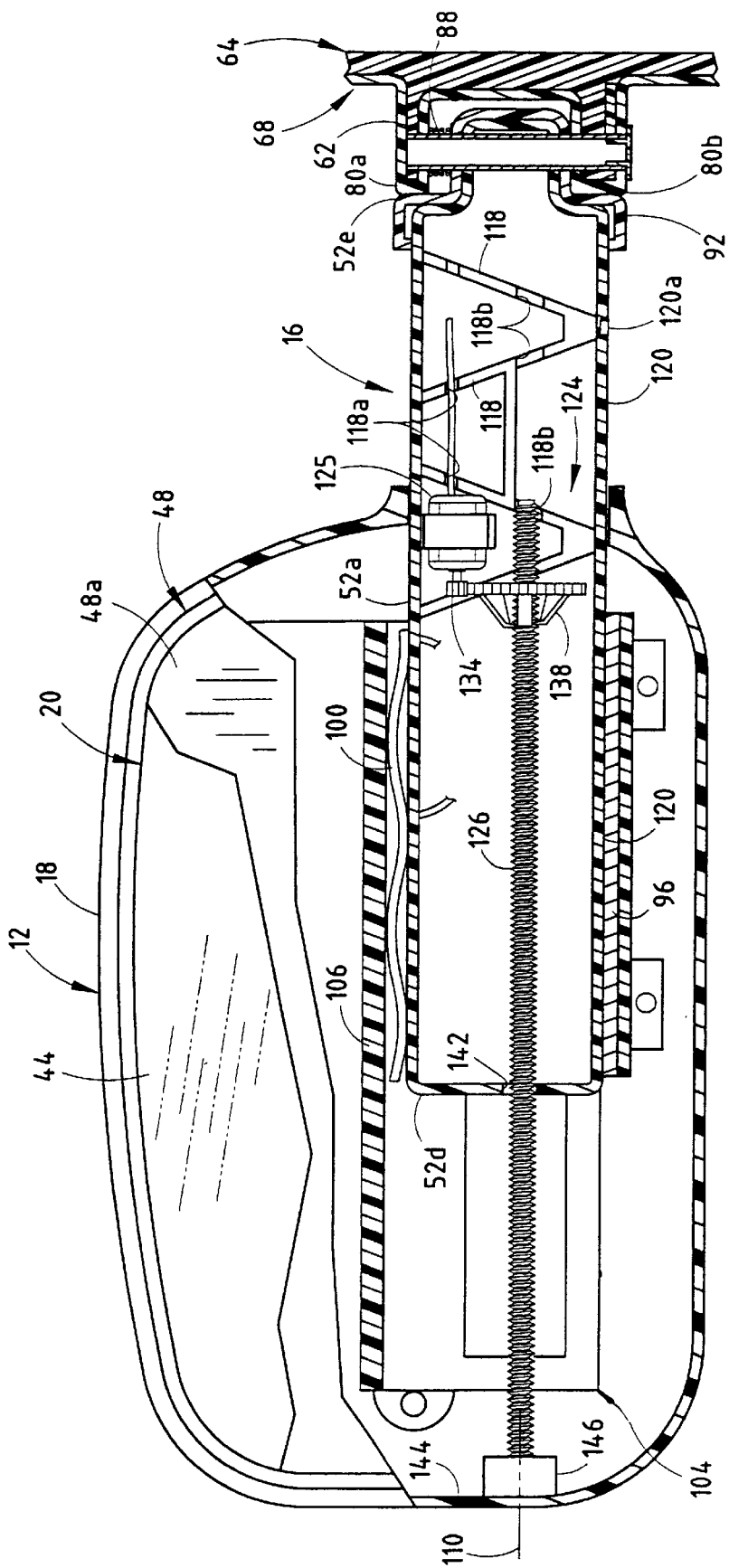
FIG. 5 is a partial cross-section view of the exterior rearview mirror assembly of FIG. 1 illustrating an optional driver assembly of the present invention.
Figure 6:
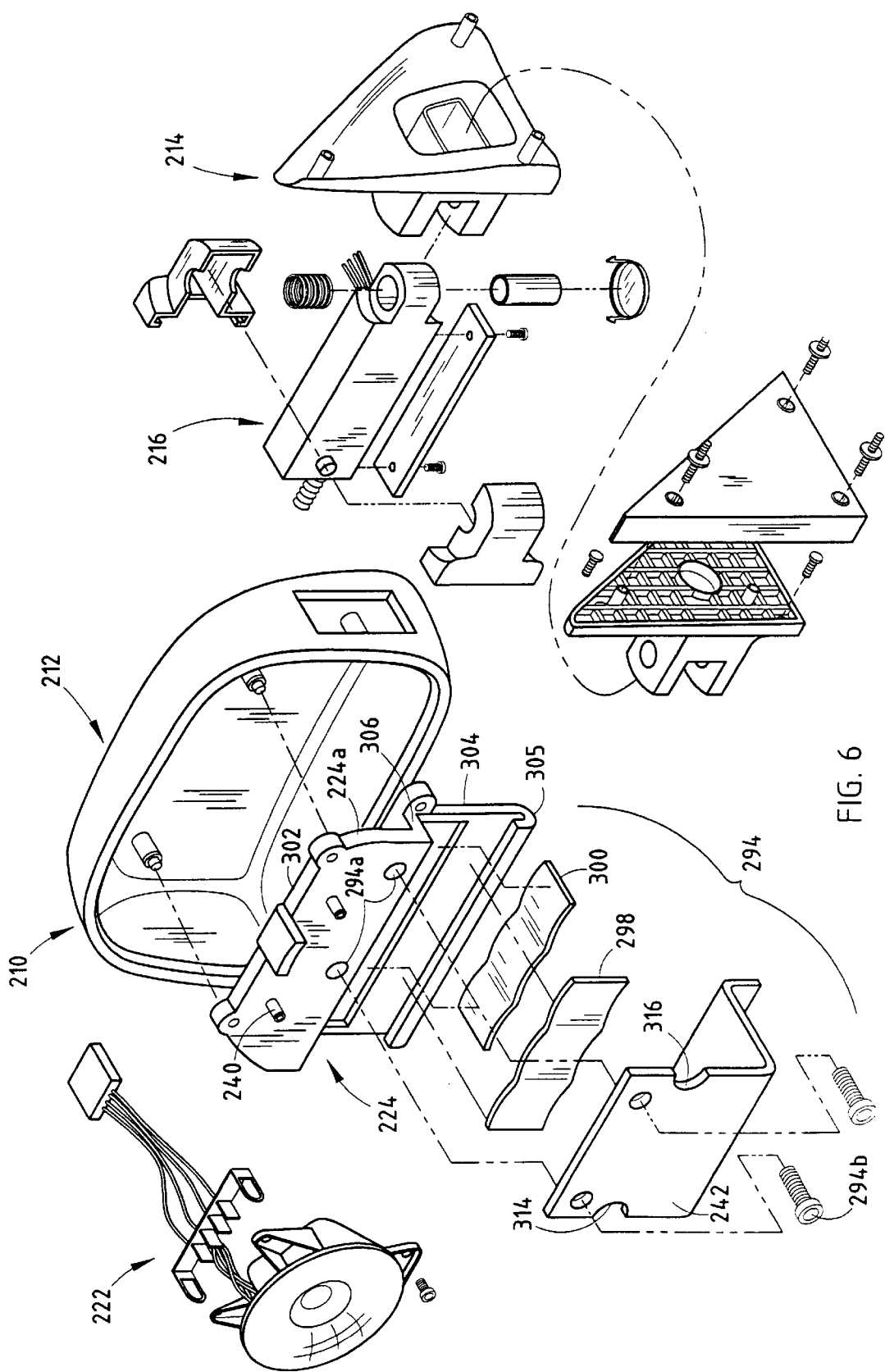
FIG. 6 is an exploded perspective view of a second embodiment of the support arm mounting arrangement.
Figure 7:
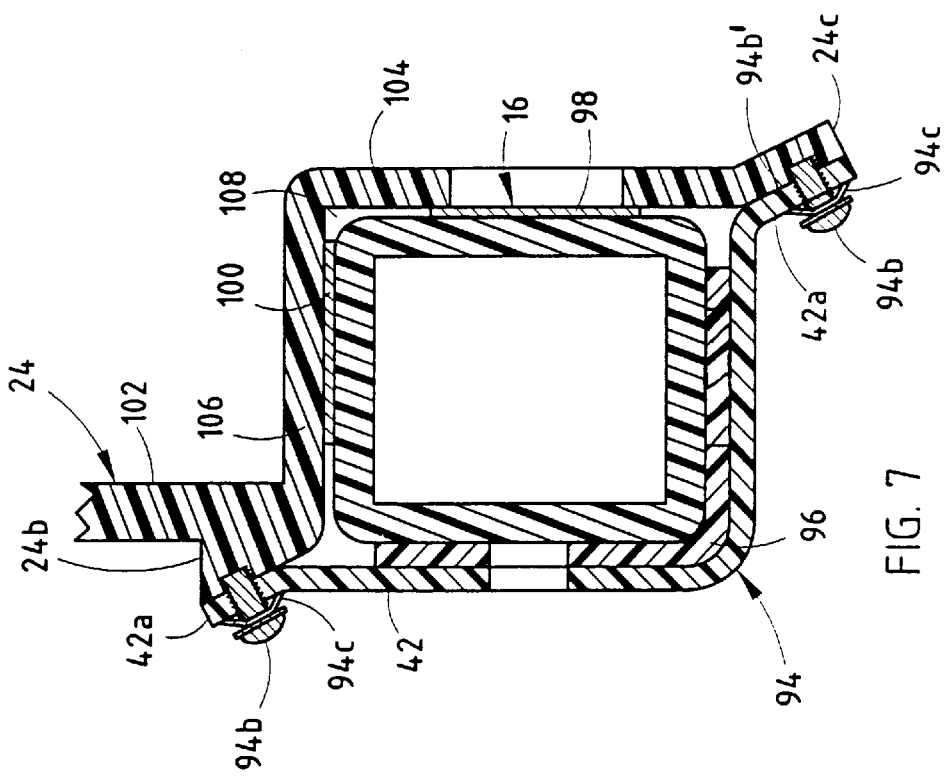
FIG. 7 is an enlarged partial cross-sectional view taken along line VII—VII of FIG. 4.

As previously described, support arm 16 extends into opening 54 of housing 18 and is further mounted to actuator bracket 24. Actuator bracket 24 includes a clamp assembly 94 for frictionally holding support arm 16. Clamp assembly 94 includes clamp member 42, a bearing member 96, and a pair of plate springs 98 and 100. Referring to FIGS. 4, 5, and 7, actuator bracket 24 includes a body 24a with an upper planar portion 102 and a lower frame portion 104 which is offset toward rearwall 26 of housing 18 by a generally horizontal web 106 which together with lower frame portion 104 and clamp assembly 94, define a support arm receiving passage 108 (FG. 7). Clamp 42 and bearing member 96 comprise L-shaped members and are secured to respective mounting openings 94a provided on body 24a of bracket 24 by fasteners 94b and belleville or compression washers 94c to provide vertical and lateral support for arm 16 against web 106 and lower frame portion 104. In the illustrated embodiment, actuator bracket 24 includes angled mounting blocks 24a and downwardly depending mounting tabs 24b with openings 94a formed therein for receiving fasteners 94b. Further, clamp 42 includes upper and lower mounting tabs 42a with respective mounting openings 42b through which fasteners 94b extend to secure clamp 42 to actuator bracket 24. Bearing member 96 is preferably a metal bearing member, for example stainless steel, which provides a smooth guide surface for arm 16 when arm 16 is moved through passage 108. Clamp 42 and the body of actuator bracket 24 is preferably a plastic material similar to housing 18. Plate springs 98 and 100 preferably comprise metal wave springs, for example spring steel springs, which include undulating or sinusoidal cross-sections to form opposed contacting surfaces 98a, 98b, 100a, and 100b, respectively, to clamp support arm 16 between springs 98, 100 and bearing member 96 in passage 108. Thus springs 98, 100 apply a biasing force to support arm 16 to urge support arm 16 into frictional engagement with bearing member 96, as will be more fully described below.

As best seen in FIG. 7, support arm 16 extends into passage 108 and is frictionally held in place by clamp member 42 and bearing member 96 and further by wave springs 100 and 98, which are respectively positioned beneath web portion 106 and adjacent lower frame portion 104. Wave spring 98 and 100 urge support arm 16 into frictional engagement with bearing member 96 to limit movement of mirror subassembly 12 along support arm 16. When a force, which may be manually applied or applied via an electric driver, a pneumatic driver, such as an air slide, or a gas driver, sufficient to overcome the friction between support arm 16 and bearing member 96 is applied to mirror subassembly 12 along an axis of extension 10, mirror subassembly 12 moves along support arm 16 to a desired location along support arm 16 in one of at least two viewing positions and, more preferably, in one of a plurality of viewing positions between the fully retracted position and the fully extended position until the force is released. The outermost or fully extended position is defined by a stop 112 which projects from side 52b of elongated body 52 and which abuts a notch 114 provided on outer edge 96a of bearing member 96. In order to provide a symmetrical bearing member 96 that can be used on either a right hand side or left hand side exterior rearview mirror assembly, bearing member 96 preferably includes a second notch 116 on opposed free edge 96b to provide a stop for a right hand mirror assembly (not shown).

As previously noted, wave springs 98, 100 preferably comprise metal wave springs, and more preferably comprise stainless steel wave springs. Similarly, bearing member 96 preferably comprises a metal bearing member, and more preferably a stainless steel bearing member to provide a smooth contact between bearing member 96 and support arm 16. As best seen in FIG. 5, wave springs 98, 100 bear on support arm 16 with contacting surfaces 98a and 100a at discrete lines or points of contact. Since springs 98 and 100 have undulating cross-sections, springs 98 and 100 permit varying compression across their lengths and, further, can accommodate lateral movement perpendicular to their axis of compression. Because springs 98 and 100 provide varying compression, springs 98 and 100, therefore, are able to absorb manufacturing tolerances of the various components, including the actuator bracket 24, support arm 16, clamp 42, and bearing member 96 while maintaining a sufficient biasing force to provide substantially uniform friction between support arm 16 and actuator bracket 24 so that mirror subassembly 12 will exhibit a substantial uniform stiffness in its various viewing positions.

Figure 15:
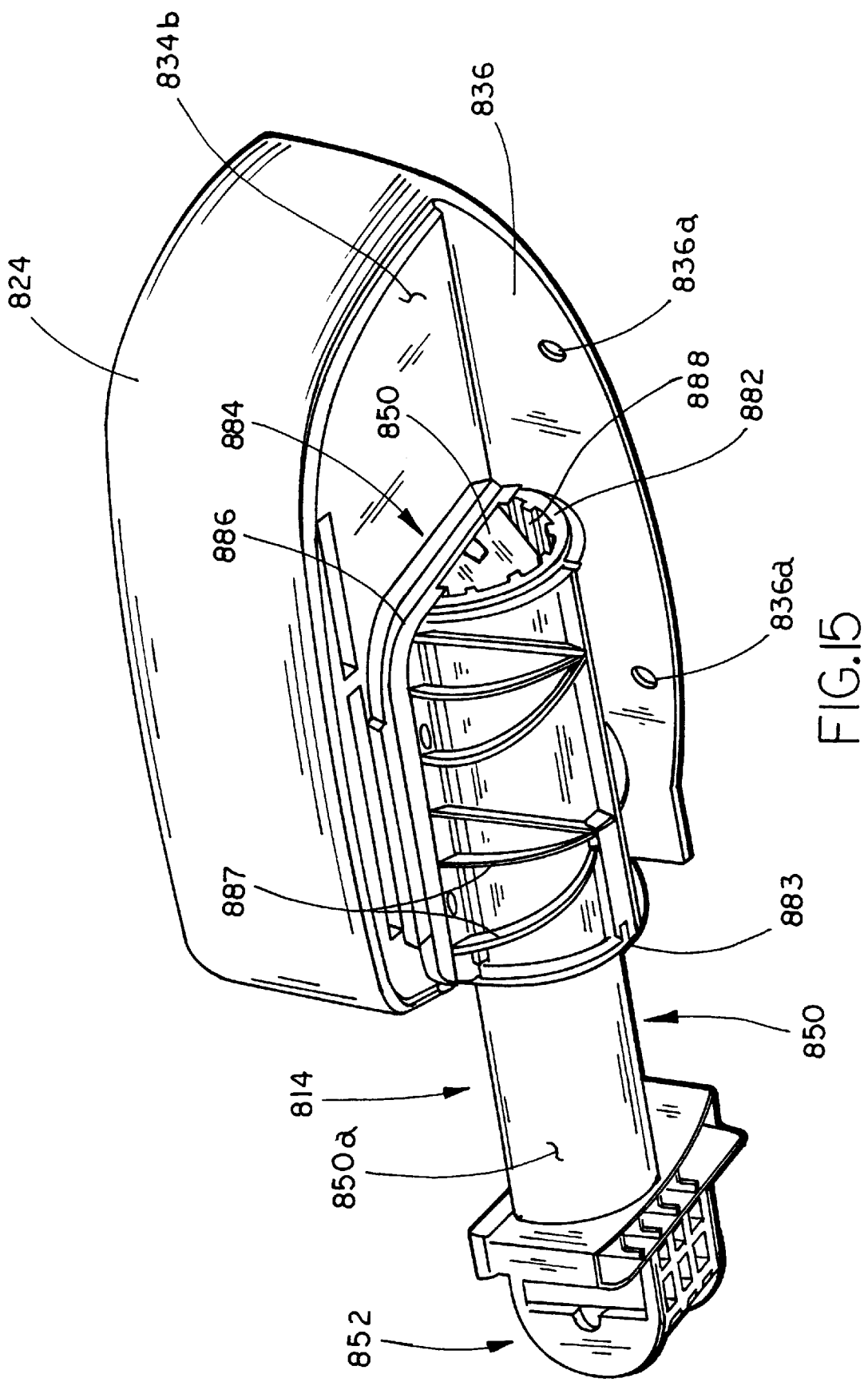
FIG. 15 is a back perspective view of the mirror casing and support arm illustrated in FIG. 13.

As best seen in FIG. 15, support arm 16 preferably comprises a hollow support arm which is reinforced by webs or ribs 118; thus, support arm is sufficiently stiff and yet light weight to reduce the overall weight of the exterior rearview mirror assembly 10. Furthermore, support arm 16 preferably includes a cover 120 which is secured to ribs 118 by fasteners 120a to enclose the space or interstices 122 between the ribs 118 so that when subassembly 12 is fully extended the hollow design of arm 16 will be hidden from view. Additionally, ribs 118 preferably include a plurality of openings 118a, 118b which are respectfully aligned to form transverse passages through arm 16 to permit cable or wiring to extend through the arm to power and/or communicate with various devices, including for example the actuator, the reflective element, which is typically an electrochromic element, a heater pad, which may be mounted to the reflective element to remove ice or snow and, further, to permit a threaded rod 126 to move through arm 16, as will be more fully described below. Preferably, the cable or wiring is harnessed and more preferably, harnessed as a telescopic or extendable harness, such as a spring loaded retractable harness, including, for example a retractable reel, to accommodate the extended positions of the mirror subassembly. Alternately, the cable or wiring may extend through the support arm and exit the support arm, for example through the distal end of the support arm, to enter the mirror casing and, further, optionally includes a take-up portion so that when the mirror subassembly moves along the support arm the cable or wiring will accommodate the relative movement between the mirror subassembly and the support arm.

The cables and wiring may be used as part of a digital electrochromic mirror system, including a LIN interface and a digital electrochromic drive circuit (such as described in copending U.S. patent application entitled DIGITAL ELECTROCHROMIC CIRCIUT WITH A VEHCILE NETWORK SUCH AS A CAR AREA NETWORK OR A LOCAL INTERCONNECT NETWORK, Ser. No. 60/196,577 DON01 P814), filed by Niall R. Lynam and John P. Drummond on Mar. 31, 2000, the disclosure of which is hereby incorporated by reference herein in its entirety) to minimize the number or wires or cables in the mirror assembly and yet provide a variety of functions. It should be understood that the mirror assembly may include other network formats or communication formats, such as LAN, CAN, BLUETOOTH, by Motorola, Inc. and the like and communicate with other devices or components within the vehicle as part of a car area network (CAN) or multiplex system, such as is disclosed in commonly assigned U.S. Pat. No. 5,798,575, issued to O'Farrell et al., PCT International Application published Sep. 25, 1997, under International Publication No. WO 97/34780, by Fletcher et al., PCT International Application No. PCT/E98/00001, filed Jan. 9, 1998, by John P. Drummond et al. and published Jul. 16, 1998, under International Publication No. WO 98/30415, the disclosures of which are hereby incorporated herein by reference in their entireties, a Local Interconnect Network (LIN), or similar communications protocols, which may support the control of mechatronic nodes in automotive distributor applications, to similarly reduce the cabling or wiring.

In preferred form, mirror assembly 10 includes a driver assembly 124 to permit remote adjustment of the position of mirror subassembly 12 along support arm 16. As best seen in FIG. 10, driver assembly 124 includes a motor 125, transverse threaded rod 126, and a reduction gear 128 which is mounted on rod 126. Motor 125 is preferably housed in support arm 16 and includes a drive gear 134 for engaging reduction gear 128. For example, motor 125 may be mounted to upper or top wall 52a of arm 16. Threaded rod 126 is mounted to extend through aligned openings 118b provided in ribs 118 and further to extend through end wall 52d of bracket 16 through an opening 142 for mounting to end wall 144 of housing 18. Optionally, openings 118b may be threaded; however, to maintain the manual override option, described below, in preferred form, each of the openings 118b may include flexible threads or clutch fingers similar to reduction gear 128. Rod 126 is fixedly mounted to end wall 144, for example, by a mounting block 146. In this manner, when motor 125 is actuated, drive gear 134 engages reduction gear 128 to move up and down threaded rod 126 to thereby move mirror subassembly 12 along support bracket 16. Reduction gear 128 preferably includes a plurality of flexible threads or threaded fingers 138 for engaging the threads of rod 126. Fingers 138 form clutch fingers and release from rod 126 when a sufficient force is applied to housing 18 along axis 110 to permit manual adjustment of the position of mirror subassembly 12 along support arm 16 and, further, to provide a safety release in the event that there is an obstruction that prevents mirror subassembly 12 from moving along axis 110. It can be appreciated that the clutch formed by the flexible threads or fingers also permits a manual override of the motor, for example in the event that the motor is inoperable, such as when there is a power failure, thereby providing a fail safe "limp home" manual override.

In order to further reduce the vibration of reflective element assembly 20, mirror assembly 10 includes one or more spring dampeners 150. Spring dampeners 150 comprise generally L-shaped members with a mounting flange 152 for securing to the rearward surface 50 of reflective element support holder 48 for example by an adhesive or the like. Projecting from mounting flange 152 is an arm 154 which includes a raised portion 156 for extending under a corresponding tab or flange 158 provided on actuator bracket 24. Arm 154 frictionally engages the lower surface 160 of tab 158, which is preferably recessed. In addition, free edge 162 of tab 158 includes a bulbous or enlarged portion 164 which guides arm 154 under tab 158 during the assembly process. Vibration dampener 150 acts as a spring and absorbs and dampens the vibration in reflective element assembly 20.

It can be understood from the foregoing that mirror subassembly 12 is selectively movable along support arm 16 so that mirror subassembly 12 can be positioned in a plurality of extended positions, including an outmost outboard position or towing position for viewing rearward portions of the vehicle, including towed objects. Additionally, mirror subassembly 12 can be retracted to a normal operating position close to the vehicle door. It should be understood further that the mirror subassembly 12 can be moved to an infinite number of positions between the fully retracted position to the fully extended position or a plurality of defined or discrete positions defined, for example by stops or the like. Mirror subassembly 12 can be also pivoted about mounting bracket 14 between a normal operating position to a folded break-away position close to the vehicle body. In addition, rearview mirror assembly 10 may include a powerfold mechanism. A "powerfold" mechanism is typically operated and actuatable/deactuatable from within the vehicle cabin either by a user operator switch or by a speed sensor that folds the mirror out when a predetermined vehicle velocity is sensed and that upon activation by the driver causes a folding portion of the exterior mirror assembly, for example housing 18, to fold or move or pivot about a fold-away axis, for example bushing 62, on a non-folding portion, for example bracket 14, of exterior mirror assembly 10, from its normally extended viewing position wherein mirror assembly 10 provides a field of view to a compact, folded position wherein the rearwardly facing side of the folding portion is disposed generally parallel to the vehicle body. "Powerfold" exterior rearview mirrors are conventional and, therefore, the specific details of the "powerfold" mechanisms are omitted herein. In many European countries, "powerfold" exterior rearview mirror assemblies are used during parking to reduce the width of the vehicle. Preferably and desirably, the vehicle system associated logic includes a powerfold enablement inhibitor so that the powerfold mechanism operates only when the mirror is in the retracted, non-extended position. If the mirror subassembly is electrically extendable, for example, a control is preferably provided that retracts the mirror subassembly along the support arm to its retracted, non-extended position before folding the mirror subassembly and support arm inwardly toward the vehicle. Alternatively, the entire arm and mirror subassembly may fold in; thus, folding the extended mirror subassembly, including a fully extended mirror subassembly. These and other features may be included in rearview mirror assembly 10.

For example, mirror subassembly 12 may incorporate a heater pad, for example the heater disclosed in U.S. Pat. No. 5,151,824, a signal light or security light disclosed in U.S. Pat. Nos. 5,669,705; 5,497,305; 5,497,306; 5,371,659; 5,669,704; 5,863,116 and co-pending application Ser. No. 09/102,414 filed June 22, 1998, for VEHICLE EXTERIOR MIRROR SYSTEM WITH SIGNAL LIGHT, co-pending application Ser. No. 09/174,747 for UNIVERSAL EXTERIOR VEHICLE SECURITY LIGHT, filed Oct. 19, 1998, now U.S. Pat. No. 6,149,287, all commonly assigned to Donnelly Corporation of Holland, Mich., the disclosures of which are incorporated herein in their entireties. In addition, other electrical or electronic components may be mounted in housing 12 such as an interface transaction system described in U.S. pending patent application entitled A VEHICLE MOUNTED REMOTE TRANSACTION INTERFACE SYSTEM, filed by Martin DeVries and Niall R. Lynam on Apr. 8, 1998, Ser. No. 09/157,428, now U.S. Pat. No. 6,158,655, and/or an electronic module, which may include one or more electrical or electronic devices such as antennas, circuitry for rain sensors, heating elements and the like as described in pending U.S. patent application entitled MODULAR REARVIEW MIRROR ASSEMBLY INCLUDING ELECTRONIC MODULES, Ser. No. 08/02, 228, filed Aug. 23, 1996, now U.S. Pat. No. 6,019,475, by Niall Lynam et al. and which are commonly assigned to Donnelly Corporation of Holland, Mich., the disclosures of which are herein incorporated by reference in their entireties. Other features which may be added to the vehicle mirror subassembly 12, include global positioning system antennas and/or receivers, as disclosed in commonly assigned U.S. patent application Ser. No. 08/569,851, filed Dec. 8, 1995, by Roger L. Veldman and Desmond O'Farrell for A VEHICLE GLOBAL POSITIONING SYSTEM NAVIGATIONAL AID, now U.S. Pat. No. 5,971,552; and blind spot detection systems, such as disclosed in U.S. Pat. Nos. 5,786,772 and 5,929,786, the disclosures of which are hereby incorporated herein by reference. Other features which may be incorporated or combined with the features of the present invention include blind spot detectors, sensors, for example control sensors for control circuit including control circuits for electrochromic elements, temperature sensors for controls or indicators, heading sensors; intelligent highway control systems (IHCS); intrusion detectors; antennas, such as the GPS antenna, car phone antennas, radio antenna and the like; microphones; speakers; garage door opener transmitters and antennas; an automatic toll booth payment system, such as a PASS™ system; transceivers; a node and/or controller for a vehicle multiplex and/or car area network; a remote transaction system; or telecommunication devices, such as ONSTAR™ found in General Motors' vehicles of Detroit, Mich., or RESCU™ available form Ford Motor Company of Detroit, Mich. In addition, one or more cameras may be incorporated into the rearview mirror assembly. These cameras may be forward or rearward facing depending on the application. For example, cameras may be used as part of a headlamp control system such as disclosed in U.S. Pat. No. 5,796,094, a rearview vision system for vehicles such as disclosed in U.S. Pat. No. 5,670,935 and in PCT Publication No. 96/38319, AN IMAGE CAPTURING SYSTEM, such as disclosed in pending U.S. patent application Ser. No. 09/199,909, filed Nov. 25, 1998, all commonly assigned to Donnelly Corporation of Holland, Mich. and incorporated by reference herein in their entireties. Also, a headlamp control from the type disclosed in commonly assigned U.S. Pat. No. 5,715, 093 issued to Kenneth L. Schierbeek and Niall R. Lynam for AUTOMATIC REARVIEW MIRROR SYSTEM WITH AUTOMATIC HEADLIGHT ACTIVATION, the disclosure of which is hereby incorporated by reference, may be included in mirror subassembly 12. For other features, reference is made to U.S. Pat. No. 5,798,575, which is commonly assigned to Donnelly Corporation of Holland, Mich., the disclosure of which is incorporated in its entirety by reference herein.

Figure 8:
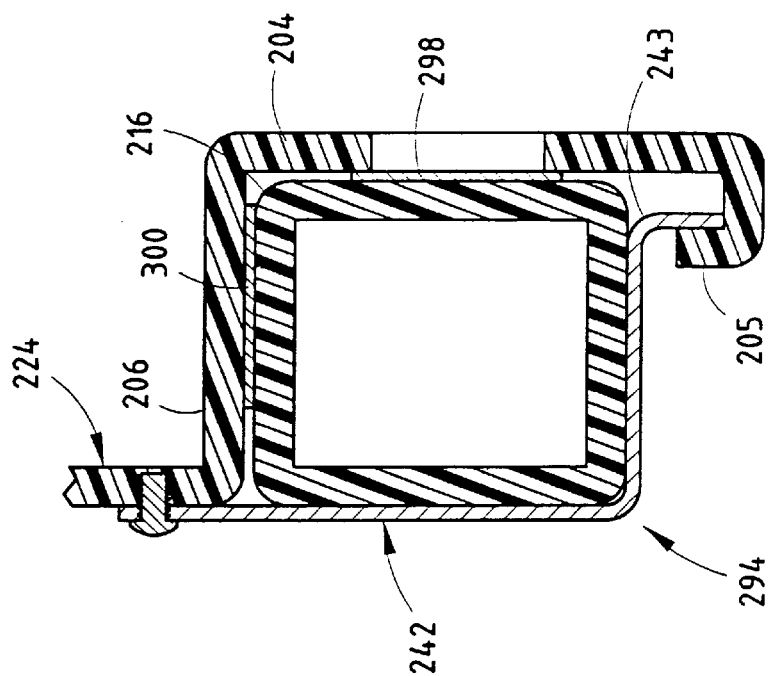
FIG. 8 is a similar view to FIG. 7 illustrating the mounting arrangement of the second embodiment of the support arm mounting arrangement of FIG. 6.

Referring to FIG. 7, a second embodiment of mirror assembly 210 is illustrated. Mirror assembly 210 is of similar construction to mirror assembly 10 and includes a mirror subassembly 212, a support arm 216, and a mounting bracket 214 but includes a modified actuator bracket 224 and clamp assembly 294. Like numerals are used to indicate corresponding parts in mirror assembly 10. Actuator bracket 224 includes a body 224a with generally planar upper portion 302 and a lower J-shaped portion 304. Upper portion 302 includes a plurality of mounting bosses 240 that project outwardly from planar portion 302 for securing actuator 222 to actuator bracket 224. J-shaped portion 304 is offset from upper portion 302 by a connecting web 306. As best seen in FIG. 8, clamp assembly 294 includes a generally L-shaped clamp member 242 with a downwardly extending lip 243 for engaging an upwardly turned lip or flange 305 of lower portion 304 of body 224a. Clamp member 294 is rigidly mounted to actuator bracket 224 by fasteners 294b which extend into corresponding mounting holes or openings 294a on actuator bracket 224, similar to the previous embodiment. Clamp assembly 294 further includes a pair of wave springs 298 and 300 for urging support arm 216 into frictional engagement with clamp member 242. Clamp member 242 preferably comprises a metal clamp, for example a stainless steel clamp, to provide a planar and smooth surface and which provides for a smooth movement of support arm 216 through actuator bracket 224. In this embodiment, clamp 242 includes a pair of notches 314 and 316, similar to insert 96. Clamp assembly 294 operates in a similar manner to clamp assembly 94 and, therefore, reference is made therein for further details of the function of clamp assembly 294.

Referring to FIG. 9, a third embodiment of clamp assembly 494 is illustrated. Clamp assembly 494 includes a clamp member 442 with first and second angled mounting flanges 442a for mounting to corresponding mounting tabs 505 of actuator bracket 424. Similar to the previous embodiments, wave springs 498 and 500 are positioned between actuator bracket 424 and support arm 416 to urge support arm 416 into frictional engagement with clamp member 442. Mounting flanges 442a are secured to actuator bracket 424 by fasteners 494b and preferably include belleville or compression washers 494c to releasably lock the respective fasteners in a fully engaged position. In this manner, the respective fasteners will not come loose in response to the vibration associated with most exterior rearview mirror assemblies.

A fourth embodiment of the clamp assembly 694 and actuator bracket 624 is illustrated in FIGS. 10 and 11. Clamp assembly 694 comprises a clamp member 642 and a pair of wave springs 698 and 700. Similar to clamp member 242, clamp member 642 comprises a generally L-shaped clamp with a downwardly depending flange or lip 643 which engages a corresponding upwardly extending flange or lip 705 of actuator bracket 624. Projecting outwardly from upper planar portion 702 of actuator bracket 624 are a pair of threaded pins or studs 702a which extend into corresponding openings 645 provided in clamp 642. As best seen in FIG. 11, each opening 645 is formed at the center of a plurality inwardly extending radial tabs formed in clamp member 642. In this manner, studs 702a can be press fit into openings 645 and yet will be rigidly held in place by the radial tabs which respectively engage the threads on the respective studs 702a.

Referring to FIG. 12, a third embodiment 810 of the exterior rearview mirror assembly of the present invention is illustrated. Exterior rearview mirror assembly 810 includes a mirror subassembly 812 and a support 814 for mounting mirror subassembly 812 onto a mounting bracket 816, which is adapted to mount to a vehicle. In this embodiment, mirror subassembly 812 is mounted on support 814 for movement between a retracted normal operating position (as shown) to a plurality of extended positions (a fully extended position shown in FIG. 14) which are suitable when the vehicle is used for towing. In preferred form, support 814 is mounted to mounting bracket 816 as a break-away support such that when mirror subassembly 812 is impacted, mirror subassembly 812 will pivot about mounting bracket 816 to a folded, break-away position. Furthermore, mirror subassembly 812 is mounted on support 814 so that mirror subassembly 812 can be manually adjusted along support 814 to move mirror subassembly 812 to a desired extended position without the use of tools, as will be more fully described below.

Figure 12B:
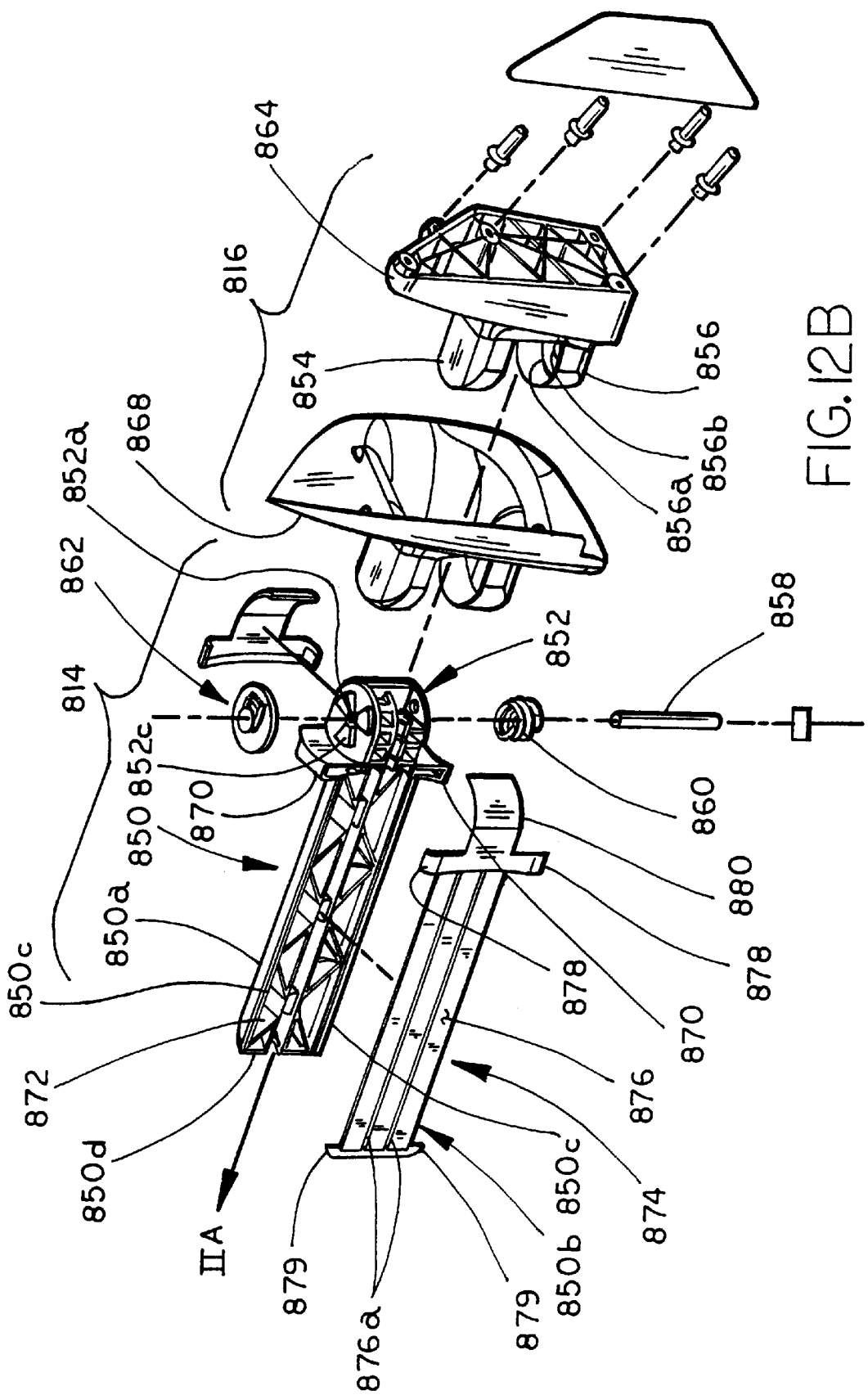

Referring to FIGS. 12A and 12B, mirror subassembly 812 includes a housing 818 and a reflective element assembly 820, which is preferably mounted in housing 818 by a positioning device 822. Positioning device 822 provides for adjustment of the orientation of reflective element assembly 820 about one or more axes. Preferably, positioning device 822 comprises an electrical actuator, as previously described, which provides adjustment about two axes, as is known in the art. Housing 818 includes a mirror casing 824 which defines a cavity 826 in which reflective element assembly 820 and actuator 822 are mounted. Housing 818 further includes a cover 828 which mounts to the forward facing side of mirror casing 824 and together with mirror casing 824 defines a second cavity 830 into which support 814 extends, as will be more fully described below. The terms "forward facing" and "rearward facing" as used herein refer to when the mirror assembly is mounted to a vehicle. "Forward facing" means in a direction toward the front of the vehicle, while "rearward facing" refers to a direction toward the rear of the vehicle.

Mirror casing 824 is formed by a casing wall 832 which defines cavity 826 and includes a back wall 834 on which actuator 822 is mounted. As best seen in FIG. 12A, back wall 834 includes a plurality of webs 834a, which provide reinforcement to back wall 834, and a plurality of mounting bosses 838 for mounting positioning device 822 to mirror casing 824. In addition, exterior surface 834b of back wall 834 or forward facing side of mirror casing 824 includes a generally L-shaped lower mounting flange 836 for mounting support 814 and cover 828 onto casing 824. Cover 828 includes a pair of mounting bosses 828a, which receive fasteners to secure cover 828 to exterior surface 834b of back wall 834 of mirror casing 824. In addition, cover 828 includes a pair of downwardly depending positioning flanges 828b which engage corresponding openings 836a (FIG. 15) provided in lower mounting flange 836 of mirror casing 824.

Reflective element assembly 820 is of similar construction to reflective element assembly 20 of the first embodiment and includes a first reflective element 844 and a second reflective element 846 which are supported on a reflective element holder 848 similar to holder 48. Reflective element 844 may comprise a conventional non-electro-optic flat or planar reflective mirror element or a convex or multi-radiused/aspheric reflective mirror element. In preferred form, reflective element 844 comprises a flat or planar reflective element, while reflective element 846 preferably comprises a convex or multiradiused/aspheric to provide a wide angle view or "spotter" mirror. For further details of reflective elements 844 and 846, reference is made to the first embodiment.

Referring to FIG. 12B, support 814 includes an elongated body 850 which includes a mounting portion or flange 852 for pivotally mounting to bracket 816. Bracket 816 includes a base 864 and a pair of spaced mounting flanges 854 and 856 which project outwardly from base 864. Flange 852 is mounted between flanges 854 and 856 by a pivot or mounting pin 858. Bracket 816 also includes a base cover 868 which is secured to base 864 by fasteners, in a similar manner to the first embodiment. A bottom wall 856a of lower flange 856 includes a transverse opening 856b through which mounting pin 858 extends to couple support 814 to bracket 816. In addition, flange 856 includes a cavity in which a spring 860 is positioned for urging flange 852 into frictional engagement with upper flange 854. Pin 858 extends through spring 860 and through a transverse opening 852a provided in flange 852 of support 814 and, further, through a bearing member 862, which is positioned, such as by press fitting, in upper flange 854. Upper surface 852b of flange 852 includes a plurality of radially arranged projections 852c which cooperate with a corresponding plurality of radially arranged recesses formed on bearing member 862 to releasably fix the position of support 814 relative to bracket 816 and yet permit pivoting of support 814 on pin 858 when mirror subassembly 812 is impacted with a sufficient force to overcome the compressive force of spring 860. For examples of other suitable break-away mounting arrangements, reference is made to copending U.S. patent application entitled PIVOT SUPPORT FOR ADJUSTABLE REARVIEW MIRROR, filed Mar. 25, 1998, Ser. No. 09/047,846, by Peter Whitehead, commonly assigned to Donnelly Corporation of Holland, Mich., the disclosure of which is incorporated by reference herein.

In addition to flange 852, support 814 includes a pair of guide flanges 870 which project upwardly and downwardly from flange 852 to form stops for support 814 and further form bearing surfaces for flanges 854 and 856 and cover 868 to provide a smooth pivoting action of support 814 about bracket 816. In preferred form, elongate body 850, flange 852, and flanges 870 comprise hollow members which are reinforced by a plurality of webs 872 in order to reduce the weight of support 814 while providing adequate stiffness to support mirror subassembly 812. Support 814 may be formed from a plastic, such as an engineered plastic including, for example a mineral filled nylon, more preferably, a glass filled nylon, and is most preferably formed from a light weight metal material, for example aluminum or the like.

Referring again to FIG. 12B, support 814 further includes a plate member 874 which includes a planar portion 876 for extending over elongate body 850, and upper and lower flange portions 878, which align with and cover flanges 870, and a circumferential flange portion 880, which covers flange 852 to provide a decorative appearance to support 814 when mounted to bracket 816. Planar portion 876 includes longitudinal elongate ribs 876a, which provide linear line bearing surfaces for elongate body 850, as will be more fully described below. Plate member 874 is preferably secured to support 814 by fasteners or other suitable means, including by an adhesive or by welds and positioned between upper and lower flanges 850c of body 850 whereby plate member 874 is mounted flush with casing facing side 850d of elongate body 850. As noted, ribs 876a provide linear bearing surfaces for support arm 814, as will be more fully described below. In preferred form, elongate body 850 includes a D-shaped cross-section with an arcuate surface 850a on one side and planar surface 850b, which is provided by planar member 876, for facing mirror casing 824. In addition, plate member 874 also includes a second pair of flanges 879 which project upwardly and downwardly from planar portion 876 to define stops for support 814 when support 814 is fully extended from mirror subassembly 812, which will be more fully described in reference to clamp assembly 884 below.

Figure 13:
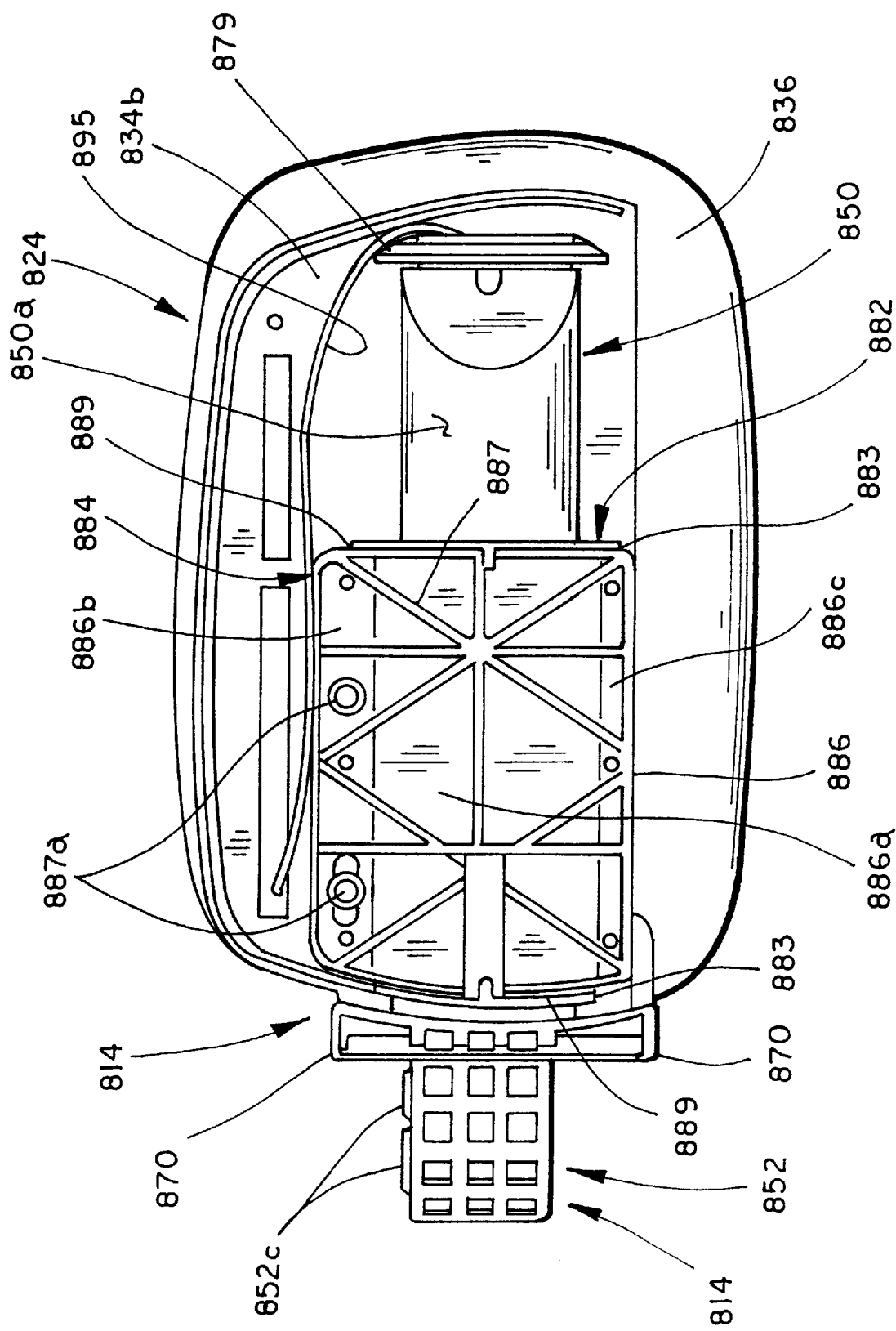
FIG. 13 is a back elevation view of the mirror casing and support arm of the exterior rearview mirror assembly of FIG. 12 with a cover removed illustrating the mirror casing in a non-extended position along the support arm.
Figure 14:
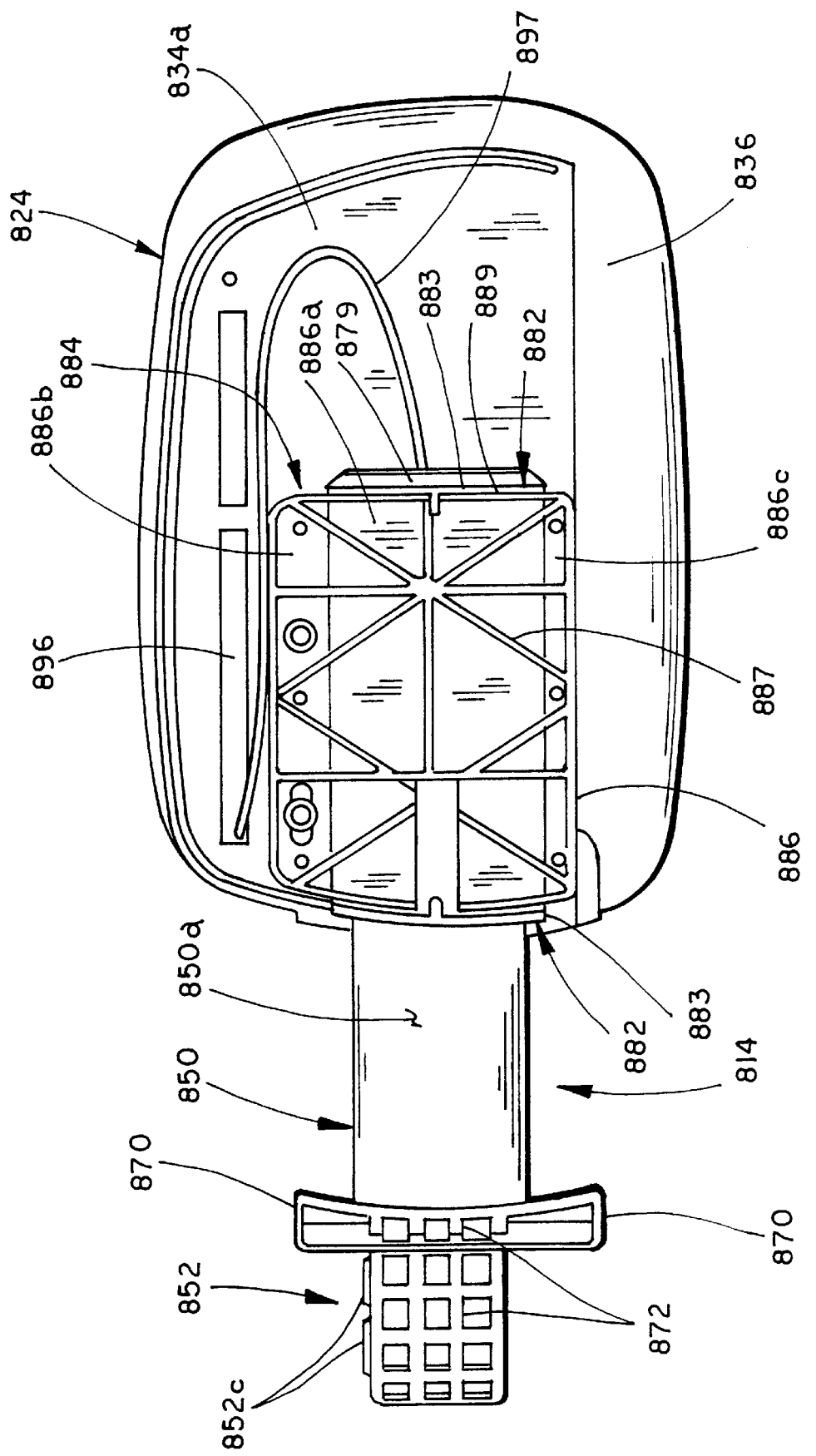
FIG. 14 is a similar view to FIG. 13 illustrating the mirror casing in an extended position along the support arm.

As best seen in FIGS. 13 and 14, when arm 814 is extended into passage 830, support 814 is mounted to mirror casing 824 by a clamp assembly 884. In preferred form, clamp assembly 884 includes a clamp 886 with an arcuate body 886a and a load distributing member 882. Clamp 886 is preferably formed from a light weight but strong material, and more preferably, from a reinforced polymer, such as mineral filled nylon, and most preferably clamp 886 is formed from a 30% glass filled nylon. Together, clamp 886 and load distributing member 882 define an elongate D-shaped passage 888 (FIG. 15) when mounted to casing 824 for receiving elongate body 850 of support 814 and which urge support 814 into frictional engagement with mirror casing 824 to releasably fix the position of mirror subassembly 820 along support 814. In preferred form, mirror casing 824 includes a bearing member 834c mounted to exterior surface 834b of back wall 834, which provides a wear plate. Preferably, bearing member 834c comprises a low friction plate, such as metal, including aluminum, plastic, an acetyl material, or the like.

Figure 12C:
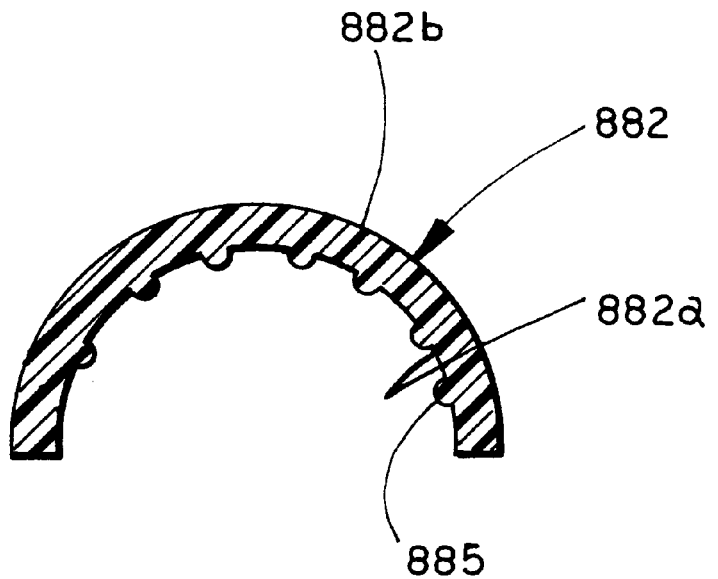
FIG. 12C is an enlarged side view of a load distributing member of the mirror assembly of FIG. 12B.

Referring to FIGS. 12A and 12C, load distributing member 882 includes an elongate arcuate body having an arcuate inner surface 882a for engaging arcuate surface 850a of body 850 and an arcuate outer or exterior surface 882b, which is engaged by clamp 886. Preferably, load distributing member 882 is formed from a low friction material, such as an engineering polymer resin, such as nylon, acetyl, or the like. Load distributing member 882 also includes retaining flanges 883 at its opposed ends to provide stops and restrain member 882 in clamp 886 when support 814 is moved through passage 888 (FIG. 15). As best seen in FIGS. 13 and 14, retaining flanges 883 bear against the opposed free edges 889 of arcuate portion 886a whereby member 882 is restrained in passageway 888. Inner surface 882a of member 882 preferably includes a plurality of elongate ribs 885 for frictionally engaging arcuate surface 850a of support 814 and which are aligned along the direction of extension of support 814. By providing a plurality of elongate ribs 885, member 882 is able to accommodate variations in manufacturing tolerances of support elongate body 850.

Referring to FIGS. 13–15, clamp 886 includes a pair of mounting flanges 886b and 886c which extend upwardly and downwardly, respectively, from arcuate portion 886a for mounting clamp 886 to mirror casing 824 to thereby urge support 814 into frictional contact with bearing member 834. Furthermore, outer surface 886a' of arcuate portion 886a preferably includes a plurality of ribs or webs 887 which provide reinforcement to arcuate portion 886a which assures that clamp 886 will apply generally uniform pressure to load distributing member 882. Flanges 886b and 886c are mounted to mirror casing 824 by a plurality of fasteners 887a which extend through corresponding mounting openings 887b and 887c and through corresponding openings 834c' of bearing member 834c and then turn to a corresponding plurality of mounting openings provided in back wall 834 of mirror casing 824. Thus, clamp 886 and member 882 are rigidly mounted to outer surface 834a of back wall 834.

As best understood from FIGS. 12, 12A, and 12B, when an extension force is applied to mirror subassembly 812 in a direction indicated by arrow A in FIG. 11, which is of sufficient magnitude to overcome the friction between support 814 and bearing member 834, housing 818 moves or slides on elongate body 850 of support 814. Housing 818 slides on support 814 to one of its extended positions until such force is released. As best seen in FIG. 14, when mirror subassembly 812 is fully extended along support 814, flanges 879 of plate member 874 bear against flanges 883 of bearing member 882 which in turn bear against flanges or free edges 889 of clamping member 886, thus providing stops for support 814 or subassembly 812. Likewise, when a force is applied in a direction opposite to arrow A, housing 818 will move toward the vehicle body, with flanges 870 providing stops.

Figure 12D:
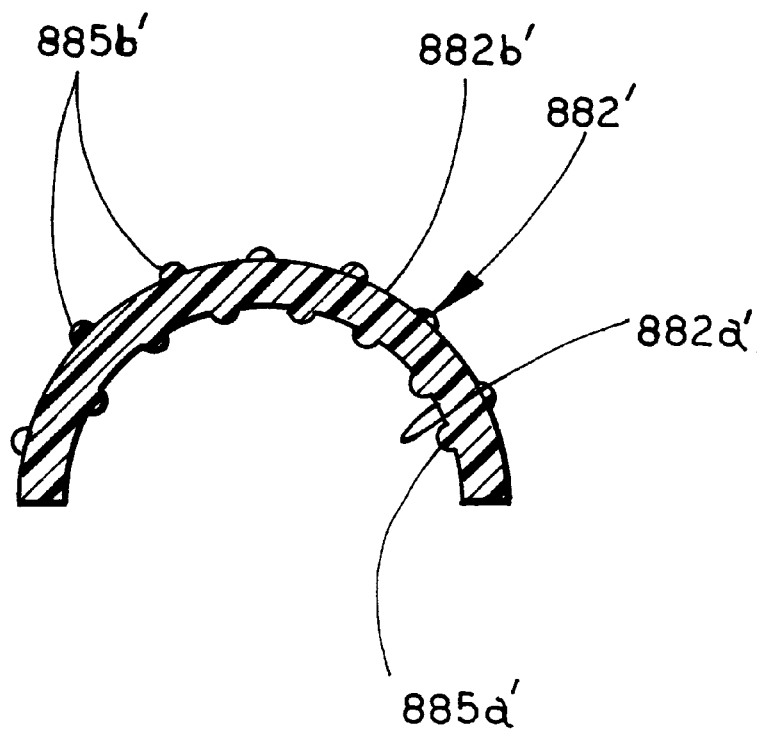
FIG. 12D is an enlarged view of a second embodiment of the load distributing member of FIG. 12C.

Referring to FIG. 12D, a second embodiment 882' of the load distributing member of the present invention is illustrated. Member 882' is of similar construction to member 882 and includes an elongate body having an arcuate cross-section defining an outer arcuate bearing surface 882b' and an inner arcuate surface 882a'. Inner arcuate bearing surface 882a' includes a plurality of longitudinal ribs 885a' which extend along the axis of extension of the support (814) similar to ribs 885. In addition, outer surface 882b' includes a plurality of longitudinally extending projections 885b'. Projections 885b' are offset from projections 885a' to form regions of flexibility which form localized spring members along the elongated body of load distributing member 882'. In this manner, member 882' provides a biasing or spring force to support 814.

Similar to mirror assembly 10, mirror assembly 810 includes a cable or wiring which extends through support 814 to power and/or communicate the various components in housing 818. The cable or wiring is preferably harnessed and, more preferably, harnessed as a telescopic or extendable harness, such as a spring loaded harness so that the harness can extend and retract assisted by a spring to accommodate the relative movement between the housing and the support. A suitable spring loaded harness may include, for example, a retractable reel. Alternately, as best seen in FIGS. 13 and 14, cable or wiring 895 may extend through the support arm and exit the support arm, for example through the distal end of the support arm, to enter the mirror casing through an opening 896 in back wall 834a and, further, optionally includes a take-up portion 897 so that when the mirror subassembly moves along the support arm the cable or wiring will accommodate the relative movement between the mirror subassembly and the support arm.

Figure 16:
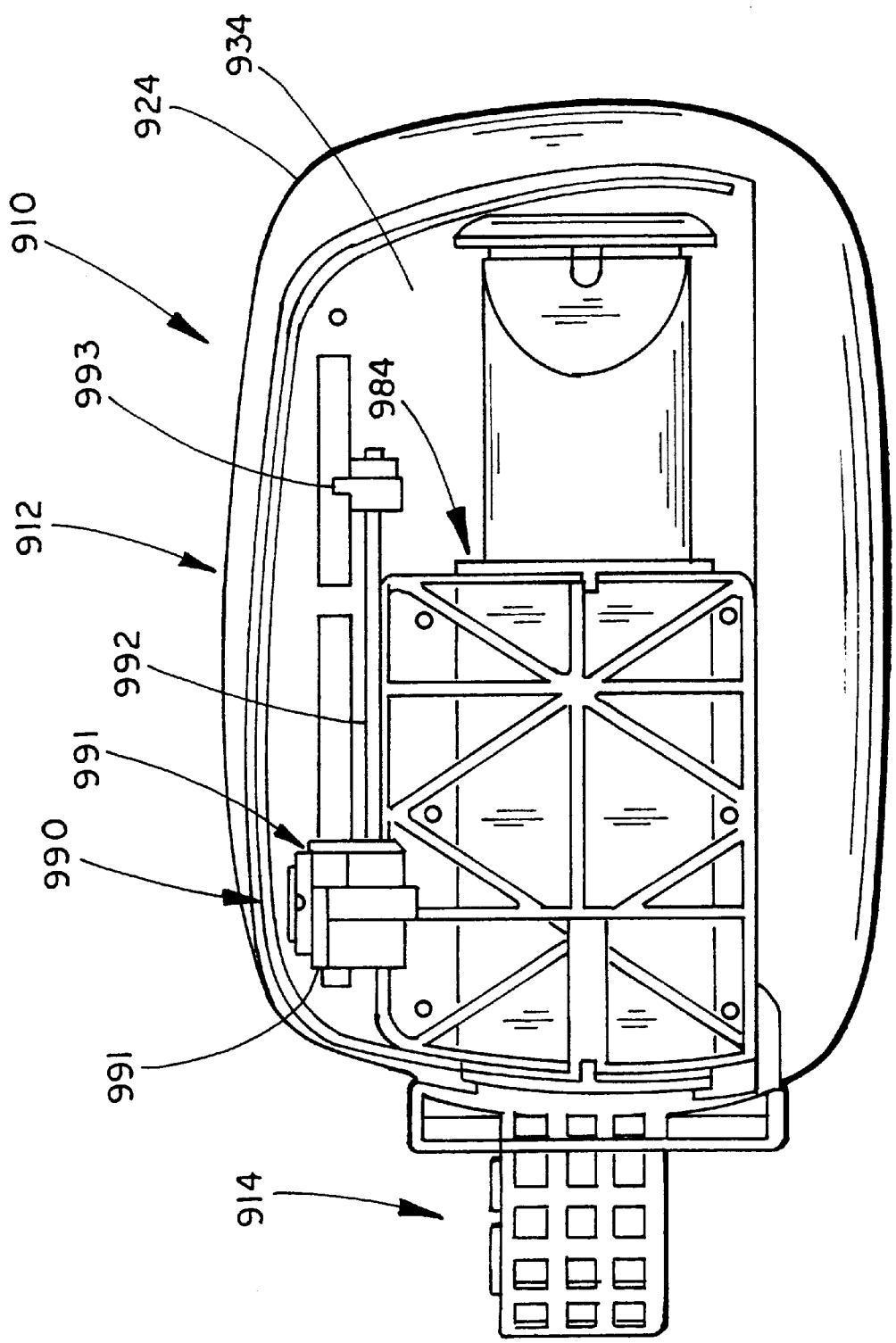
FIG. 16 is a back elevation view of a fourth embodiment of the exterior rearview mirror assembly of the present invention illustrating an extendable mirror casing similar to the second embodiment incorporating a driver.
Figure 17:
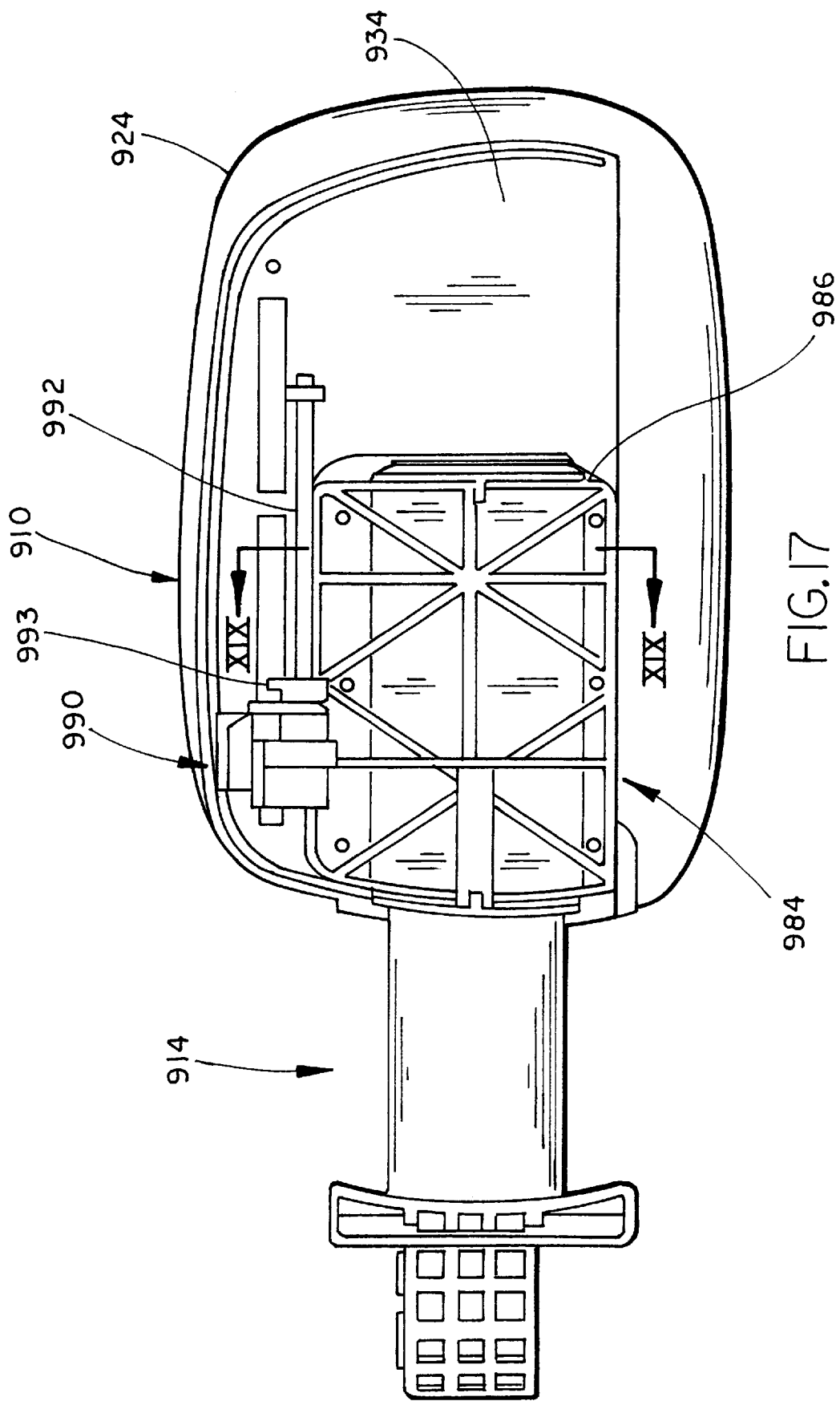
FIG. 17 is a back top perspective view of the mirror assembly of FIG. 16 illustrating the mirror casing in an extended position.
Figure 18:
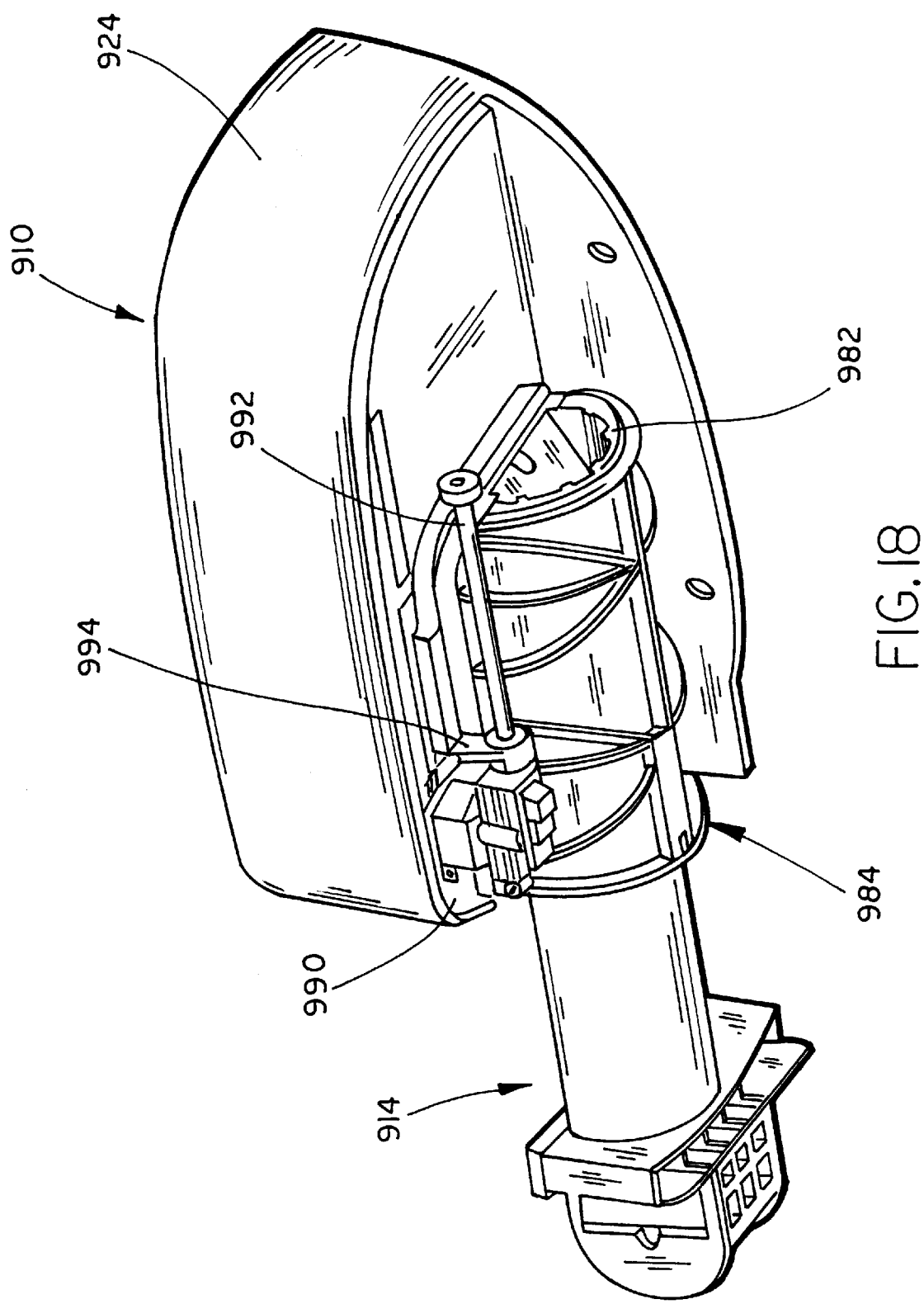
FIG. 18 is a back perspective view similar to FIG. 17 illustrating the mirror casing in an extended position.

Referring to FIGS. 16–18, the numeral 910 generally designates a fourth embodiment of the exterior rearview mirror assembly of the present invention. Mirror assembly 910 includes a mirror subassembly 912 (shown with cover removed) and a support 914 for mounting mirror subassembly 912 onto a mounting bracket similar to mounting bracket 816. Mirror subassembly 912 includes a housing and a reflective element assembly supported in the housing similar to the previous embodiment. The housing includes a mirror casing 924, which is of similar construction to mirror casing 824, and a cover (not shown), also similar to cover 828. Therefore, reference is made to the third embodiment for further details of the housing, casing 924 and the cover. Support 914 extends into the housing and frictionally engages housing similar to support 914 and is mounted in housing by clamping assembly 984. Therefore, reference is made to the second embodiment for further details of support 914 and clamp assembly 984 as well.

In the illustrated embodiment, exterior rearview mirror assembly 910 is a motor driven extendable mirror assembly and includes a driver 990 for moving mirror subassembly 912 of exterior rearview mirror assembly 910 along support 914 between a fully retracted position (FIG. 16) and a plurality of extended positions, including a fully extended position (FIG. 17), similar to the previous embodiment. In this manner, in contrast to applying a manual force to the mirror subassembly, the mirror subassembly is extended in response to a force included by driver 990.

Figure 19:
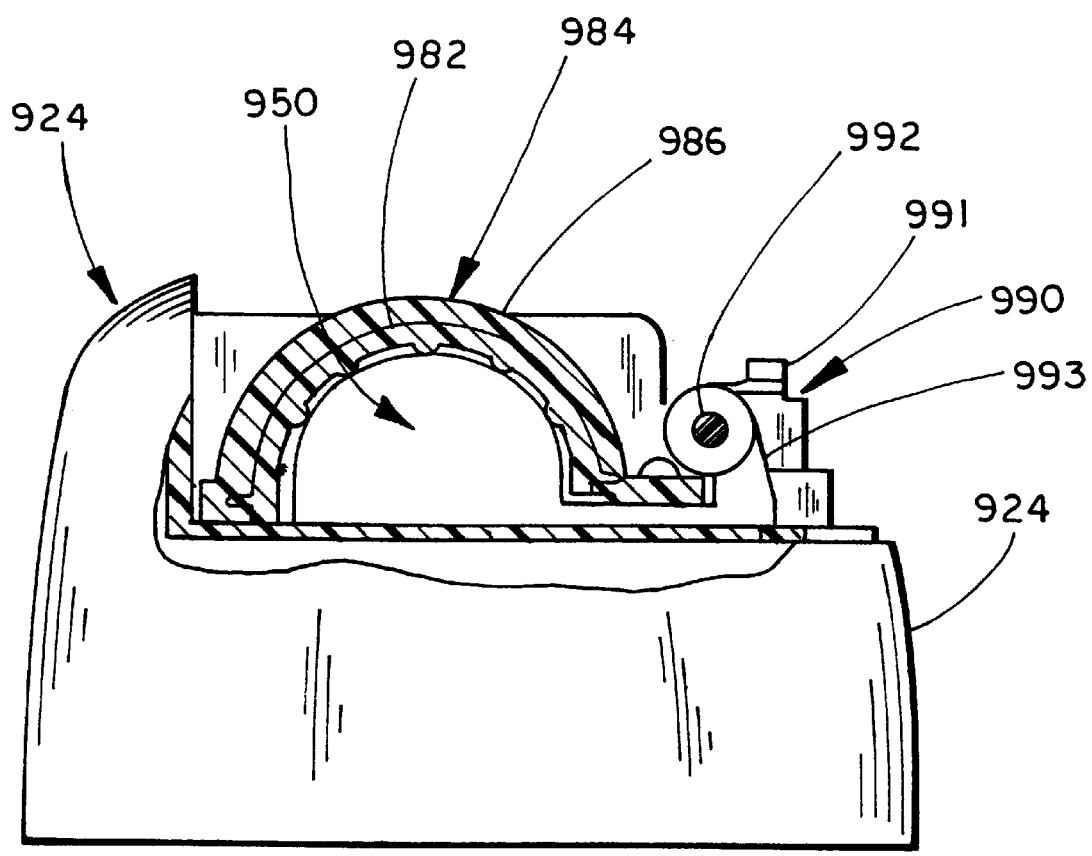
FIG. 19 is a partial cross-section view taken along line XIX—XIX of FIG. 16.

As best seen in FIGS. 16 and 17, driver 990 includes a motor 991 and a threaded rod 992. Motor 991 is enclosed in a motor housing and includes a worm drive gear (not shown) which engages threaded rod 992 to drive threaded rod 992, which is supported in housing 991a. Both motor 991 and threaded rod 992 are mounted in a fixed arrangement to mirror casing 924, preferably on back wall 934 of casing 924. Mounted on threaded rod 992 is a threaded coupler 993. As best seen in FIG. 19, threaded coupler 993 extends from threaded rod 992 behind clamp 986 and member 982 of clamp assembly 984 to elongate body 950 of support 914. In this manner, when motor 991 is actuated and drives coupler 993 along threaded rod 992, housing 918 moves along support 914. It should be understood, that motor 991 may be selectively actuated to move the mirror subassembly to a plurality of intermediate positions between a fully extended position (FIGS. 17 and 18) and a fully retracted position (FIG. 16). In addition, driver 990 may incorporate a clutch mechanism (not shown), such as described in reference to FIG. 5 or as described in copending U.S. patent application Ser. No. 09/267,532, filed Mar. 12, 1999, the disclosure of which is incorporated by reference herein in its entirety. In this manner, a manual force may be used to extend or retract the mirror subassembly and override the driver.

It should be understood that the mirror assembly of the present invention provides an extendible mirror subassembly that is supported by a unitary support. The support extends into the housing wherein the support frictionally engages a portion of the interior of the housing so that the mirror subassembly can be moved along the support either manually or by a driver without tools. In addition, the housing includes a mirror casing, which defines a first cavity in which the reflective element is supported, preferably by a positioning device, and a cover which defines a second cavity into which the support extends to frictionally engage the mirror casing. The mirror assembly incorporates a clamp which generates a force of sufficient magnitude to urge a portion of the support into frictional engagement with the housing, and more preferably with the mirror casing, to provide a substantially rigid and stable mounting arrangement and yet of a magnitude to permit manual adjustment of the mirror subassembly along the support. By providing two cavities, one for the reflector and its associated support structure and the other for the support arm, the assembly provides increased available mounting surface without reducing the rigidity of the arrangement. In this manner, the mirror assembly is easier to assemble and further exhibits improved vibration performance.

While several of the forms of the invention have been shown and described other forms will now become apparent to those skilled in the art. For example, the reflective assembly may include a single reflective element. Furthermore, the actuator may comprise a manual or remote controlled actuator, for example a BODEN cable actuator, as previously noted. Further, other break-away mechanisms may be employed to mount the mirror subassembly on to the mounting bracket. In addition, although the present invention is described as including single or mono support arm, the concept of the invention may be used with dual mounting or support arms as well. Reference is also made to U.S. Pat. Nos. 5,903,402 and 5,969,890 and U.S. patent applications Ser. Nos. 09/310,162, filed May 10, 1999, now U.S. Pat. No. 6,113,241, and 09/312,377, filed May 14, 1999, now U.S. Pat. No. 6,139,159, for other details which may be incorporated in to the mirror assembly of the present invention, the entire disclosures of which are herein incorporated by reference in their entireties. Changes and modification to the specifically described embodiments can be carried out without departing from the principles of the invention, which is intended to be limited only by the scope of the claims as interpreted according to principles of patent law including the Doctrine of Equivalents. Therefore, it will be understood that the embodiments shown in the drawings and described above are merely for illustrative purposes only and are not intended to limit the scope of the invention which is defined by the claims that follow.

We claim:

1. An extendable exterior rearview mirror assembly comprising:

a mounting bracket for mounting to a vehicle;

a mirror subassembly having a housing and a reflective element;

a clamp; and a support mounted on said mounting bracket for pivotal movement between a normal operating position and a folded position, said support extending laterally outward from said bracket when said mirror assembly is mounted to the vehicle and said support is in said normal operating position and, further, extending into said housing, said clamp being positioned in said housing and mounting said mirror subassembly to said support and permitting selective movement of said mirror subassembly along said support to one of at least two viewing positions, said clamp applying a force to urge frictional engagement between said support and said housing to limit movement of said mirror subassembly along said support until such a force is applied to said mirror subassembly sufficient to overcome said frictional engagement between said support and said housing.

2. The extendable exterior rearview mirror assembly according to claim 1, wherein said support comprises a single support arm.

3. The extendable exterior rearview mirror assembly according to claim 1, further comprising a load distributing member, said load distributing member and said clamp urging frictional engagement between said support and said housing.

4. The extendable exterior rearview mirror assembly according to claim 3, wherein said support moves relative to said load distributing member when said mirror subassembly is moved along said support.

5. The extendable exterior rearview mirror assembly according to claim 3, wherein said clamp includes a longitudinal passage, said load distributing member positioned in said passage, and at least a portion of said support extending through said longitudinal passage.

6. The extendable exterior rearview mirror assembly according to claim 3, wherein said load distributing member comprising an elongate member having a longitudinal extent extending along at least a portion of said support.

7. The extendable exterior rearview mirror assembly according to claim 6, wherein said load distributing member comprises an arcuate-shaped elongate member, said support having an arcuate bearing surface and a generally planar bearing surface, said load distributing member contacting said arcuate bearing surface and urging said generally planar bearing surface to engage said housing.

8. The extendable exterior rearview mirror assembly according to claim 7, wherein said support includes a composite body, said composite body including an elongate webbed member having said arcuate bearing surface and a plate bearing member having said generally planar bearing surface.

9. The extendable exterior rearview mirror assembly according to claim 1, wherein said housing includes a mirror casing, said clamp urging frictional engagement between said support and said mirror casing.

10. The extendable exterior rearview mirror assembly according to claim 9, wherein said mirror casing includes a casing wall defining a cavity, said reflective element supported in said cavity, and said clamp urging said support into frictional engagement with said casing wall.

11. The extendable exterior rearview mirror assembly according to claim 10, further comprising a positioning device, said positioning device supporting said reflective element on said casing wall.

12. The extendable exterior rearview mirror assembly according to claim 11, wherein said positioning device comprises an electrical actuator.

13. The extendable exterior rearview mirror assembly according to claim 1, further comprising a driver assembly, said driver assembly selectively applying a force in said laterally outward direction to move said mirror subassembly along said support.

14. The extendable exterior rearview mirror assembly according to claim 13, wherein said driver assembly includes a motor, said motor mounted to said mirror casing and selectively moving said mirror subassembly along said support.

15. The extendable exterior rearview mirror assembly according to claim 14, wherein said driver assembly further includes a threaded rod, said threaded rod drivingly coupled to said support and being driven by said motor to move said mirror subassembly along said support.

16. An extendable exterior rearview mirror assembly comprising:
   a mounting bracket adapted for mounting to a vehicle;
   a mirror subassembly having a housing, a reflective element, and an actuator, said housing including a mirror casing wall;
   a clamp assembly; and
   a support mounted to said mounting bracket for pivotal movement between a normal operating position wherein said support extends laterally outward from the vehicle and a folded, break-away position wherein said support is folded toward the vehicle, said mirror subassembly being supported on said support by said clamp assembly, said clamp assembly mounting said support to said casing wall and providing a force, said force providing frictional engagement between said support and said casing wall to releasably clamp said mirror subassembly on said support to limit the movement of said mirror subassembly along said support, said support moving relative to said clamp when a sufficient force is applied to said mirror subassembly to overcome said frictional engagement wherein said mirror subassembly moves along said support to one of a plurality of viewing positions.

17. The extendable exterior rearview mirror assembly according to claim 16, wherein said support frictionally engages one side of said casing wall, said actuator being mounted to another side of said casing wall.

18. The extendable exterior rearview mirror assembly according to claim 16, wherein said mirror subassembly includes a cover secured to said housing, said cover and said casing wall defining a second cavity therebetween, said support extending into said second cavity.

19. The extendable exterior rearview mirror assembly according to claim 17, wherein said support includes a planar side, said clamping assembly urging said planar side of said support into frictional engagement with said casing wall.

20. The extendable exterior rearview mirror assembly according to claim 16, wherein said support includes an elongated webbed body, said elongated webbed body including an arcuate bearing surface, said clamp assembly bearing on said arcuate bearing surface to urge said support into frictional engagement with said casing wall.

21. The extendable exterior rearview mirror assembly according to claim 17, wherein said clamp assembly includes an arcuate-shaped bearing surface engaging said arcuate bearing surface of said support to urge said support into frictional engagement with said casing wall.

* * * * *

UNITED STATES PATENT AND TRADEMARK OFFICE
CERTIFICATE OF CORRECTION

PATENT NO. : 6,239,928 B1  
APPLICATION NO. : 09/573502  
DATED : May 29, 2001  
INVENTOR(S) : Whitehead et al.

Page 1 of 1

It is certified that error appears in the above-identified patent and that said Letters Patent is hereby corrected as shown below:

Column 1:
Line 66, "aim" should be --arm--

Column 4:
Line 28, "action" should be --conjuction--

Column 5:
Line 53, "TERLURKAN" should be --TERLURAN--

Column 7:
Line 62, "FG." should be --FIG.--

Column 8:
Line 33, "10" should be --110--

Column 9:
Line 38, Insert --Attorney Docket No.-- before "DON01"
Line 38, "P814" should be P-814
Line 52, "PCT/E98/00001" should be --PCT/IE98/00001--

Column 11:
Lines 48 & 49, "08/02,228" should be --08/702,228--

Column 18:
Line 18, Insert --mounting-- before "arrangement"

Signed and Sealed this

Twenty-second Day of August, 2006

JON W. DUDAS  
*Director of the United States Patent and Trademark Office*